(12) United States Patent
Choi et al.

(10) Patent No.: US 10,721,348 B2
(45) Date of Patent: Jul. 21, 2020

(54) MOBILE TERMINAL AND METHOD FOR CONTROLLING THE SAME

(71) Applicant: LG ELECTRONICS INC., Seoul (KR)

(72) Inventors: Kyungrak Choi, Seoul (KR); Hyeonchang Choi, Seoul (KR); Jieun Lee, Seoul (KR); Junho Seo, Seoul (KR); Sanghyun Eim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/194,228

(22) Filed: Nov. 16, 2018

(65) Prior Publication Data

US 2019/0281154 A1    Sep. 12, 2019

(30) Foreign Application Priority Data

Mar. 12, 2018  (KR) .......................... 10-2018-0028801

(51) Int. Cl.
*H04M 1/725* (2006.01)
*G06F 3/0488* (2013.01)
(Continued)

(52) U.S. Cl.
CPC ...... *H04M 1/72583* (2013.01); *G06F 1/1626* (2013.01); *G06F 1/1637* (2013.01);
(Continued)

(58) Field of Classification Search
CPC ..................................................... G06F 3/0481
See application file for complete search history.

(56) References Cited

U.S. PATENT DOCUMENTS

2015/0378592 A1*  12/2015  Kim ....................... G06F 1/1626
                                                            715/765
2016/0378334 A1*  12/2016  Liu ........................ G06F 3/0481
                                                            715/794
(Continued)

FOREIGN PATENT DOCUMENTS

EP          2947538         11/2015
EP          2960750         12/2015
(Continued)

OTHER PUBLICATIONS

Korean Intellectual Property Office Application No. 10-2018-0028801, Office Action dated Jun. 24, 2019, 6 pages.
(Continued)

*Primary Examiner* — Cao H Nguyen
(74) *Attorney, Agent, or Firm* — Lee, Hong. Degerman, Kang & Waimey

(57) ABSTRACT

Provided is a mobile terminal including a display unit in which a portion of an upper end of a display region is recessed. The mobile terminal includes a main body having a front surface and a rear surface, at least one sensor disposed on the front surface of the main body, a display unit including a main display region disposed at the front surface of main body and first and second sub-display regions extending from the main display region and disposed with the at least one sensor interposed therebetween, and a controller controlling at least one function in response to a touch input applied to the display unit, wherein the controller controls different functions on the basis of which of the main display region, the first sub-display region, and the second sub-display region, the touch input starts from.

15 Claims, 25 Drawing Sheets

(51) Int. Cl.
 *G06F 1/16* (2006.01)
 *G06F 3/0486* (2013.01)
 *G06F 3/048* (2013.01)

(52) U.S. Cl.
 CPC ............ *G06F 3/048* (2013.01); *G06F 3/0486* (2013.01); *G06F 3/0488* (2013.01); *G06F 3/04883* (2013.01); *G06F 3/04886* (2013.01); *H04M 1/72547* (2013.01); *H04M 1/72597* (2013.01)

(56) References Cited

U.S. PATENT DOCUMENTS

2017/0123454 A1\* 5/2017 Evans, V ............. H04N 5/2258
2018/0052571 A1\* 2/2018 Seol ........................ G06F 3/016

FOREIGN PATENT DOCUMENTS

| EP | 3109727 | 12/2016 |
|---|---|---|
| KR | 1020170048007 | 5/2017 |
| KR | 1020180019392 | 2/2018 |
| WO | 2017075511 | 5/2017 |

OTHER PUBLICATIONS

European Patent Office Application Serial No. 18213463.5, Search Report dated Jul. 8, 2019, 12 pages.
Kim, M., "'Iphone X' is a hair loss phone? Secret of Notch Design," No Cut News, Retrieved from the Internet, Sep. 2017, 6 pages.
Lee, J., "Why follow the blamed iPhone notch design?" Cookie News, Retrieved from the Internet, Mar. 2018, 11 pages.
Korean Intellectual Property Office Application No. 10-2018-0028801, Office Action dated Dec. 2, 2019, 3 pages.

\* cited by examiner (a)

(b)

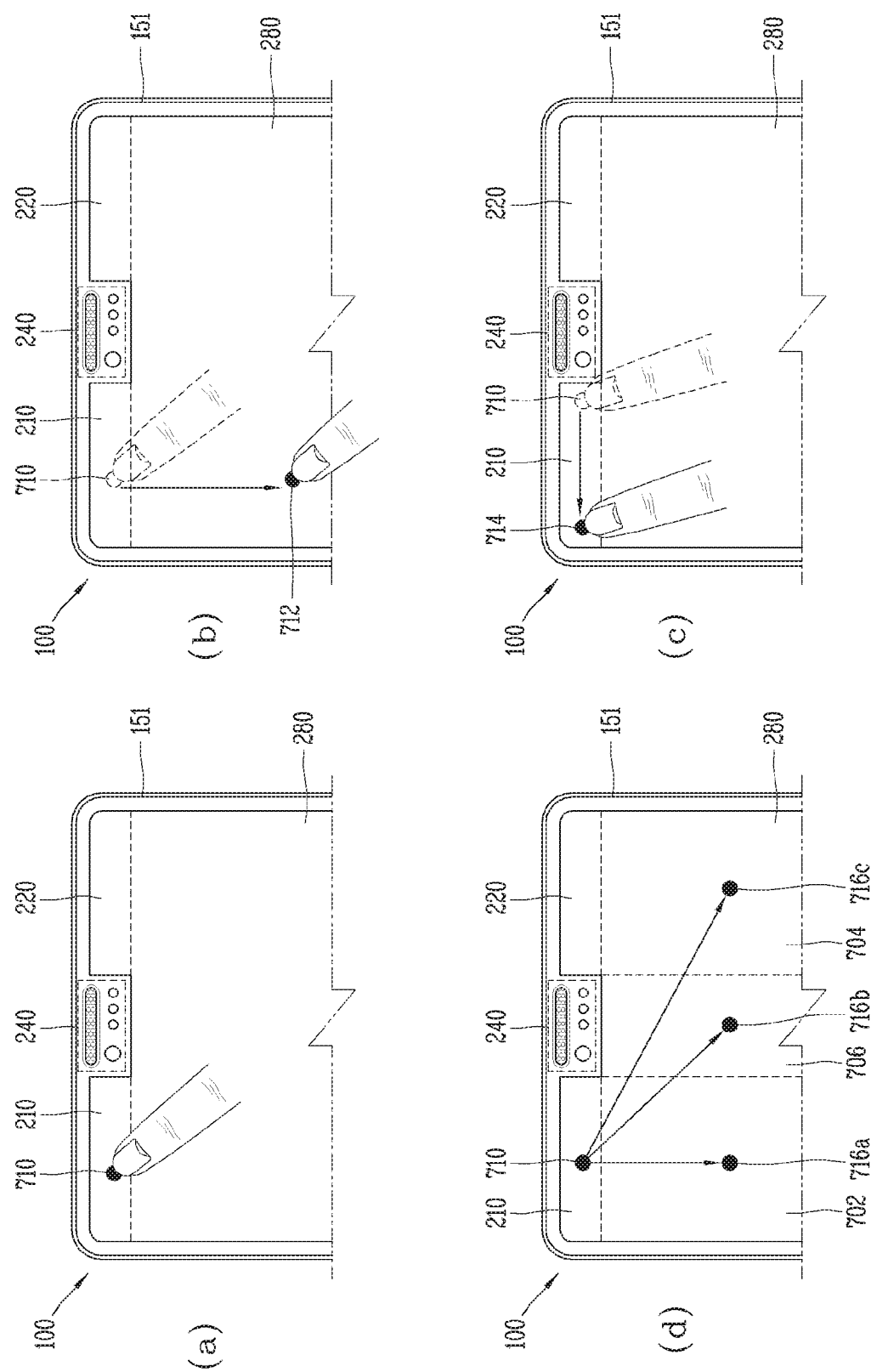

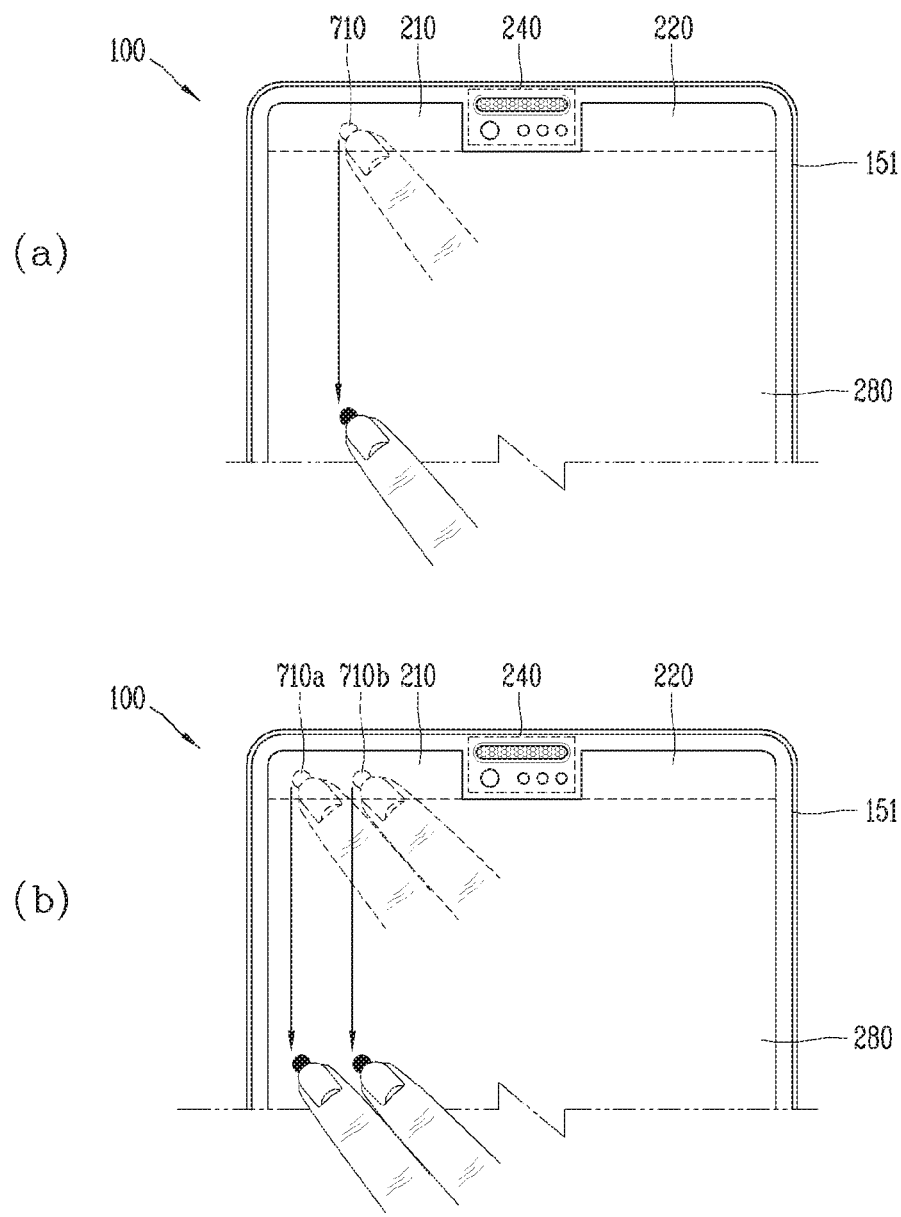

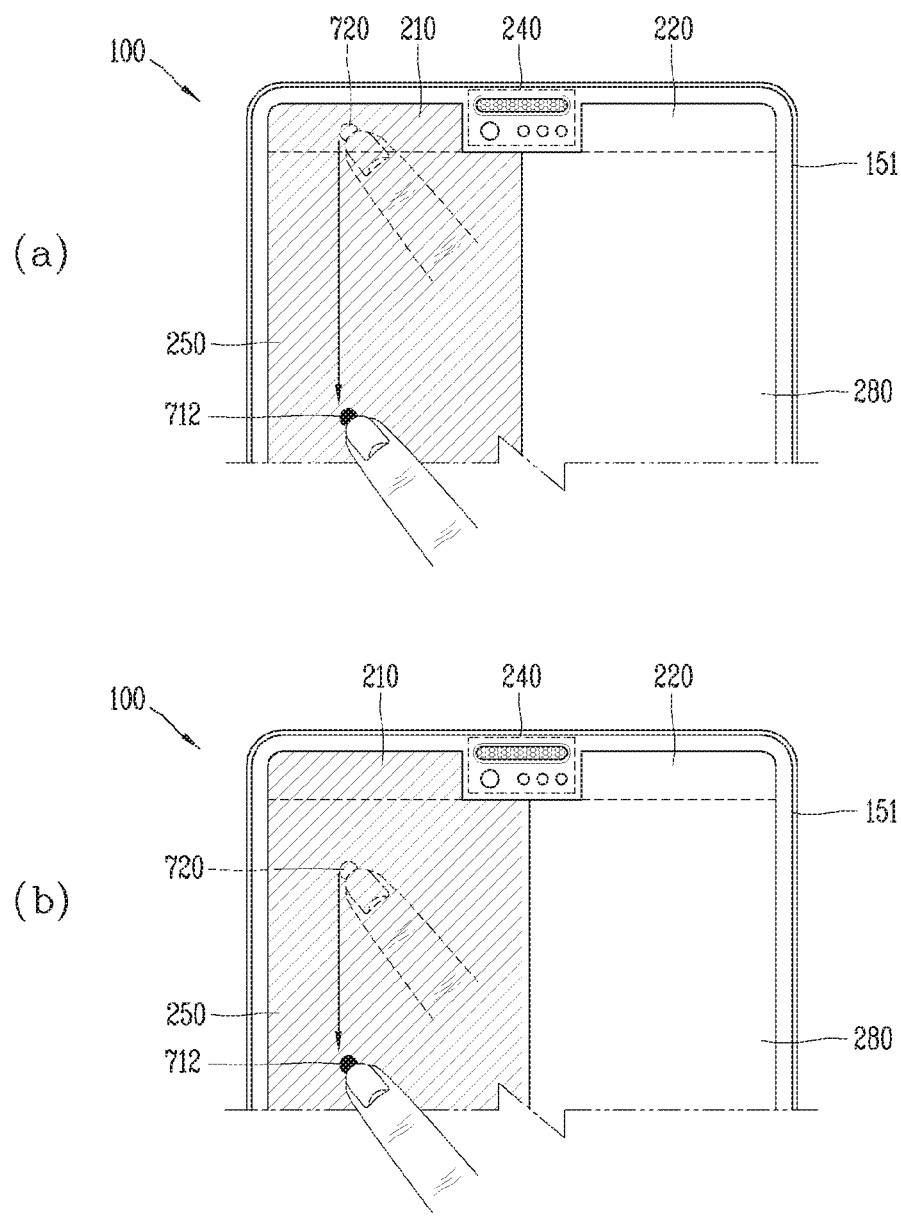

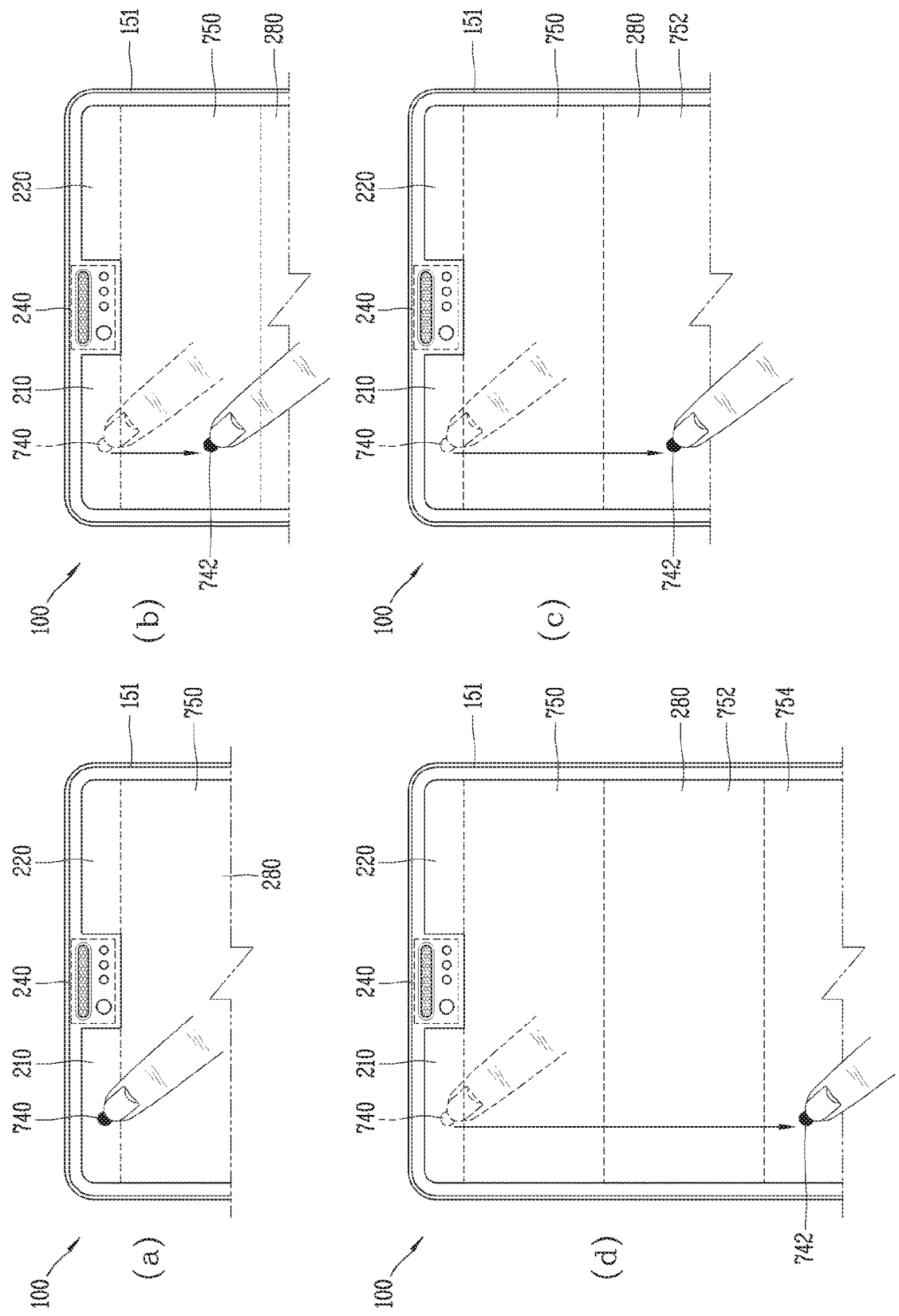

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0028801, filed on Mar. 12, 2018, the contents of which is incorporated by reference herein in its entirety.

BACKGROUND OF THE INVENTION

1. Field of the Invention

The present disclosure relates to a mobile terminal including a display unit in which a portion of an upper end thereof is recessed, and a method for controlling the same.

2. Background of the Invention

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

In order to support and enhance the functions of the terminal, improvement of a structural and/or software part of the terminal may be considered.

Meanwhile, recently, design for forming a larger screen, while reducing a size and a weight of mobile terminals, have been actively researched. As part of the research, a bezel-less design in which a bezel region is narrow in a front part of a mobile terminal including a display unit has been introduced, and based on the bezel-less design, a full-screen type mobile terminal in which 90% or greater of a front part thereof including a display unit is used as a display region for displaying image information has been introduced.

The full screen type mobile terminal may be a mobile terminal having a display region in which the entire region of the front part excluding a region in which at least one sensor and an output unit are formed and the bezel region are formed as a display unit. As part of such a full-screen type mobile terminal, a mobile terminal including a display unit having a design, in which at least one sensor such as a camera or a speaker is disposed in a predetermined region of an upper end of the display unit and the display region extends up to regions between the left and right bezel regions on the front part of the mobile terminal and the predetermined region in which the at least one sensor is disposed at the upper end of the display unit, i.e., a so-called notch design, has been introduced.

SUMMARY OF THE INVENTION

Therefore, an aspect of the detailed description is to provide a mobile terminal including a notch design display, in which a display region extending up to an upper end of a display unit is utilized, and a method of controlling the same.

To achieve these and other advantages and in accordance with the purpose of this specification, as embodied and broadly described herein, a mobile terminal includes: a main body having a front surface and a rear surface; at least one sensor disposed on the front surface of the main body; a display unit including a main display region disposed at the front surface of main body and first and second sub-display regions extending from the main display region and disposed with the at least one sensor interposed therebetween; and a controller controlling at least one function in response to a touch input applied to the display unit, wherein the controller controls different functions on the basis of which of the main display region, the first sub-display region, and the second sub-display region, the touch input starts from.

A notch region may be formed to be recessed toward the main display region between the first and second sub-display regions at the front surface of the main body.

The controller may process a touch input applied to at least one region of the main display region positioned adjacent to the notch region, as a touch input with respect to any one of the first and second sub-display regions, and process a touch input applied to the other remaining region excluding the at least one region, as a touch input with respect to the main display region.

The at least one sensor may be disposed in the notch region, and the at least one sensor may include at least one of a camera, an illumination sensor, and a proximity sensor.

In a state in which an execution screen of a first application is output on the main display region, when an event related to a second application different from the first application occurs, the controller may control the display unit to keep outputting the execution screen of the first application on the main display region and to output information related to the event on at least one of the first and second sub-display regions.

When the event occurs, the controller may control the display unit to output a first control screen related to the event on the first sub-display region and to output a second control screen related to the event on the second sub-display region, and perform different controls related to the event according to which of the first and second sub-display regions the touch input starts from.

When the second application is a call function related application and an event that occurs in relation to the second application is a call reception event, the controller may output a call reception permission function screen as a first control screen on the first sub-display region and output a call reception rejection function screen as a second control screen on the second sub-display region.

In a state in which information related to the event is displayed on the first sub-display region, when a drag touch input starting from the first sub-display region is applied, the controller may control the display unit to display an execution screen of the second application including the information related to the event on the main display region.

A display region of the execution screen of the first application which has been output on the main display region may be gradually reduced on the basis of display of the execution screen of the second application.

Different functions related to the second application may correspond to the first and second sub-display regions, respectively, and the controller may output an execution screen of a different function as the execution screen of the second application on the basis of a start point of the touch drag input among the first and second sub-display regions.

In a state in which the execution screen of the second application is displayed in a portion of the main display region corresponding to the first sub-display region, when a touch drag input starting from the second sub-display region is applied, the controller may control the display unit to display a first execution screen of the second application corresponding to the first sub-display region and a second execution screen of the second application corresponding to the second sub-display region together on the main display region.

The controller may classify the main display region into a plurality of regions including a region corresponding to the first sub-display region and a region corresponding to the second sub-display region and control the display unit to display the first execution screen and the second execution screen respectively on the region corresponding to the first sub-display region and the region corresponding to the second sub-display region, among the plurality of classified regions of the main display region.

The region corresponding to the first sub-display region and the region corresponding to the second sub-display region, among the plurality of classified regions of the main display region, may correspond to the first sub-display region and the second sub-display region, respectively, along a length direction of the display unit.

When the touch input starts from the notch region, the controller may control a function different from functions controlled when the touch input starts from the first and second sub-display regions.

When a touch input starts from any one of the first and second sub-display regions and the notch region, the controller may control the display unit to display an execution screen according to any one of different functions corresponding to the region from which the touch input starts according to the number of touch objects applying the touch input.

When a touch input starting from one point of the main display region in which at least one of a plurality of objects included in the main display region selected by a user is displayed is applied, the controller may control the display unit to display information corresponding to the at least one selected object in any one of the first and second sub-display regions on the basis of which of the first and second sub-display regions the touch input ends at.

The information corresponding to the at least one selected object may be a thumbnail image corresponding to the selected object or a portion of the selected object, and the controller may control the display unit to display the information corresponding to the at least one selected object in at least a portion of the main display region adjacent to any one of the first and second sub-display regions on the basis of a touch input applied to any one of the first and second sub-display regions.

When a touch input starts from a region in which a character string selected by the user starts, among character strings included in the main display region, and ends at any one of the first and second sub-display regions, the controller may control the display unit to display the selected character string in at least a portion of the main display region adjacent to the region at which the touch input ends, and in a state in which the character string is displayed in a portion of the main display region, the controller may control different functions related to the character string according to a touch input applied to any one of the first and second sub-display regions.

The different functions related to the character string may include a function of translating and a function of editing the character string displayed in a portion of the main display region, and on the basis of a touch applied to any one of the first and second sub-display regions in a state in which the character string is displayed in the main display region, the controller may control the display unit to display any one of an execution screen of the translation function and an execution screen of the editing function in at least a portion of the main display region.

To achieve these and other advantages and in accordance with the purpose of this specification, as embodied and broadly described herein, a method of controlling a mobile terminal includes: sensing a touch input applied to a display unit; identifying from which of a main display region disposed on a front surface of a main body of the mobile terminal and first and second sub-display regions extending from the main display region and disposed with at least one sensor interposed therebetween the touch input starts; and controlling different functions on the basis of the region from which the touch input starts.

Effects of the mobile terminal and the method for controlling the same according to the present disclosure will be described as follows.

According to at least one of the embodiments of the present disclosure, different functions may be executed based on a user input to at least one of the display regions extending to the upper end of the display, whereby the user may easily and quickly execute a desired function.

Further, according to at least one of the embodiments of the present disclosure, at least one image information related to a currently executed function is displayed in at least one of the display regions extending to the upper end of the display, whereby the user may easily check information related to a currently executed function.

Also, according to at least one of the embodiments of the present disclosure, the currently executed function may be differently processed based on different inputs applied to at least one of the display regions extending to the upper end of the display, whereby the user may check the different processing results related to the currently executed function even without going through a menu screen.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 7A to 7E are conceptual diagrams illustrating an applied touch gesture in a mobile terminal according to the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
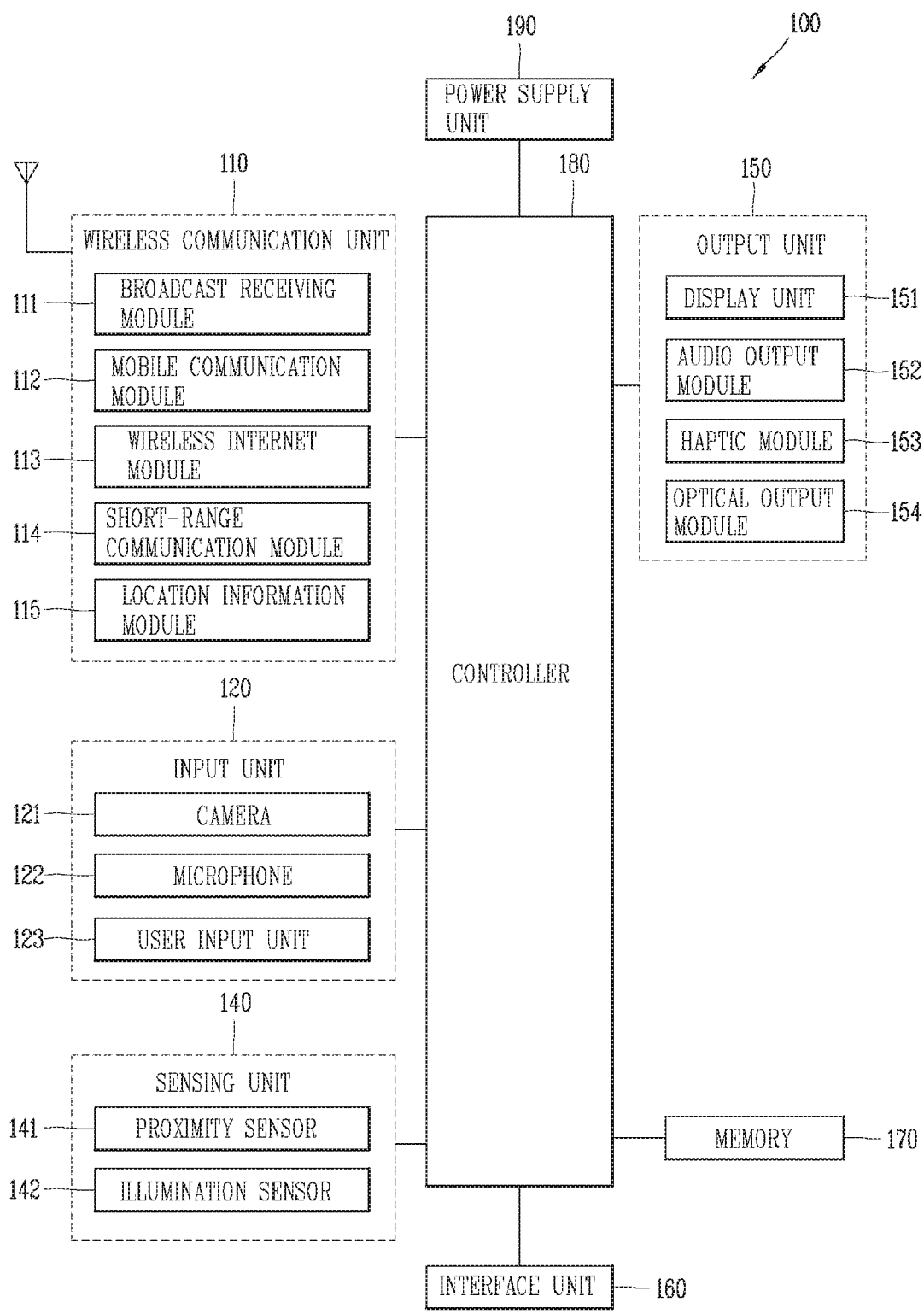
FIG. 1A is a block diagram illustrating a mobile terminal according to the present disclosure.
Figure 1B:
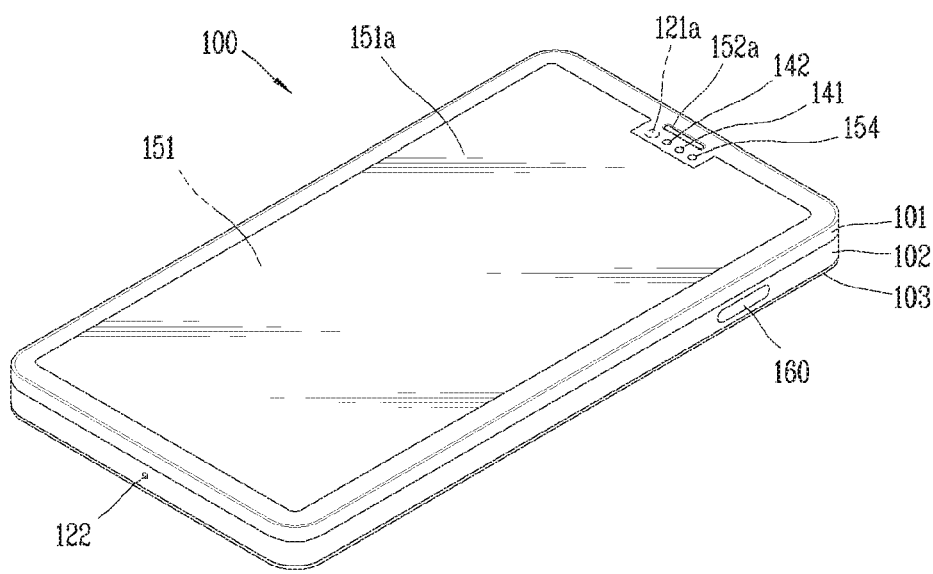
FIGS. 1B and 1C are conceptual diagrams illustrating an example of a mobile terminal according to the present disclosure, viewed in different directions.
Figure 1C:
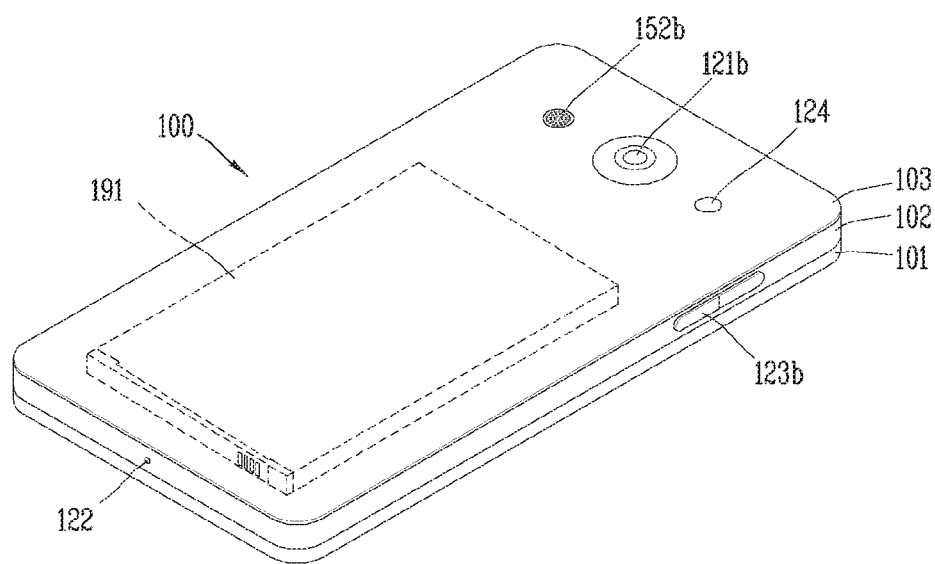
Figure 8:
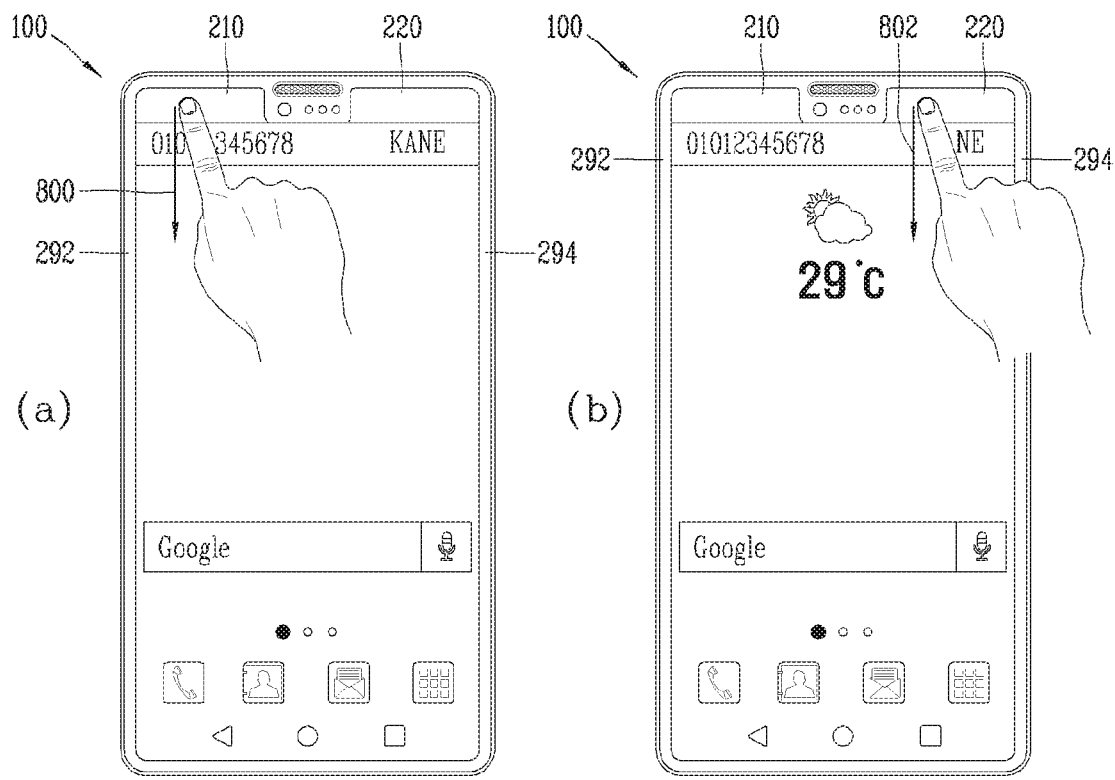
FIG. 8 is a diagram illustrating an example of performing different functions according to a touch gesture sensed in each of sub-regions in a mobile terminal according to the present disclosure.
Figure 8:
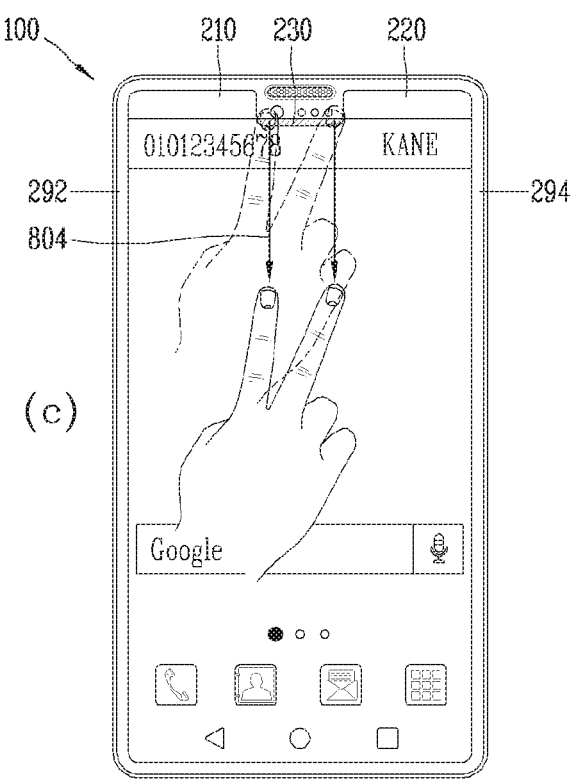
Figure 9:
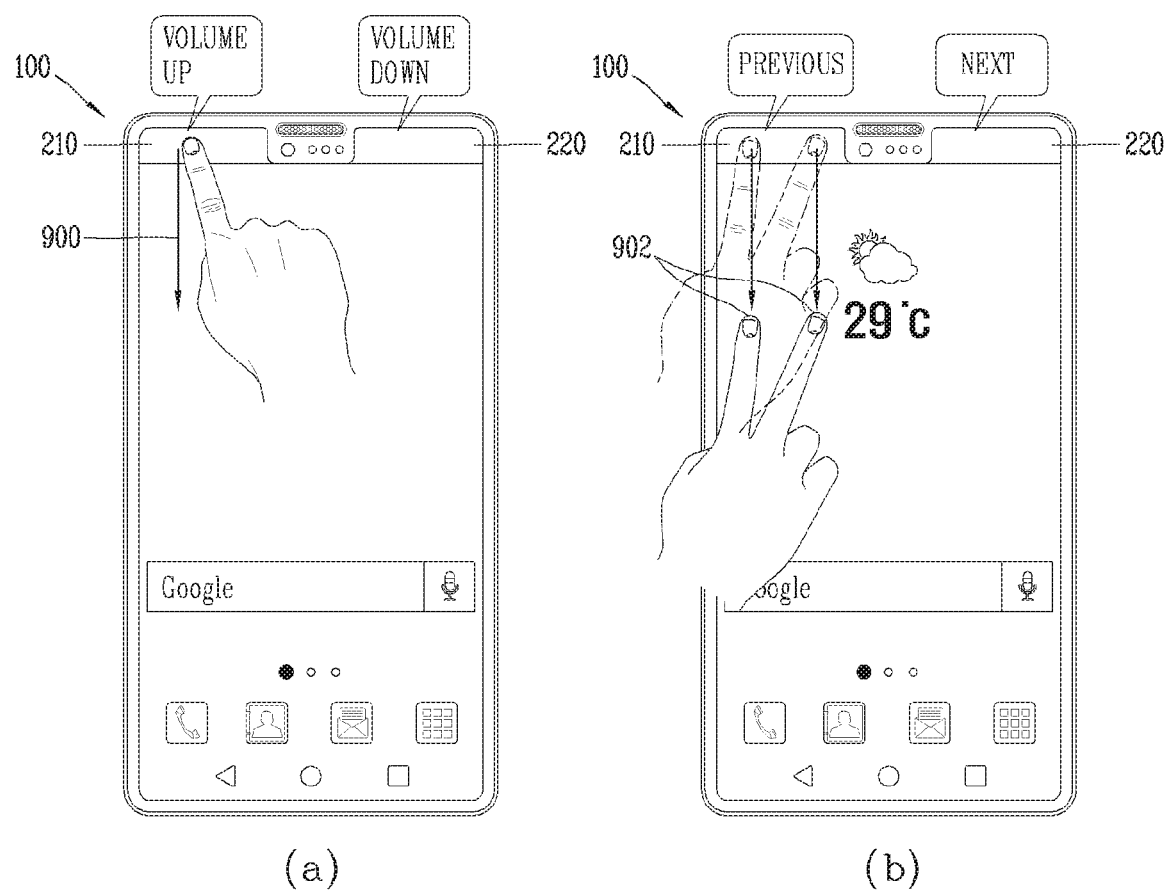
FIG. 9 is a diagram illustrating an example of performing different functions according to types of a touch gesture applied to sub-regions in a mobile terminal according to the present disclosure.
Figure 10:
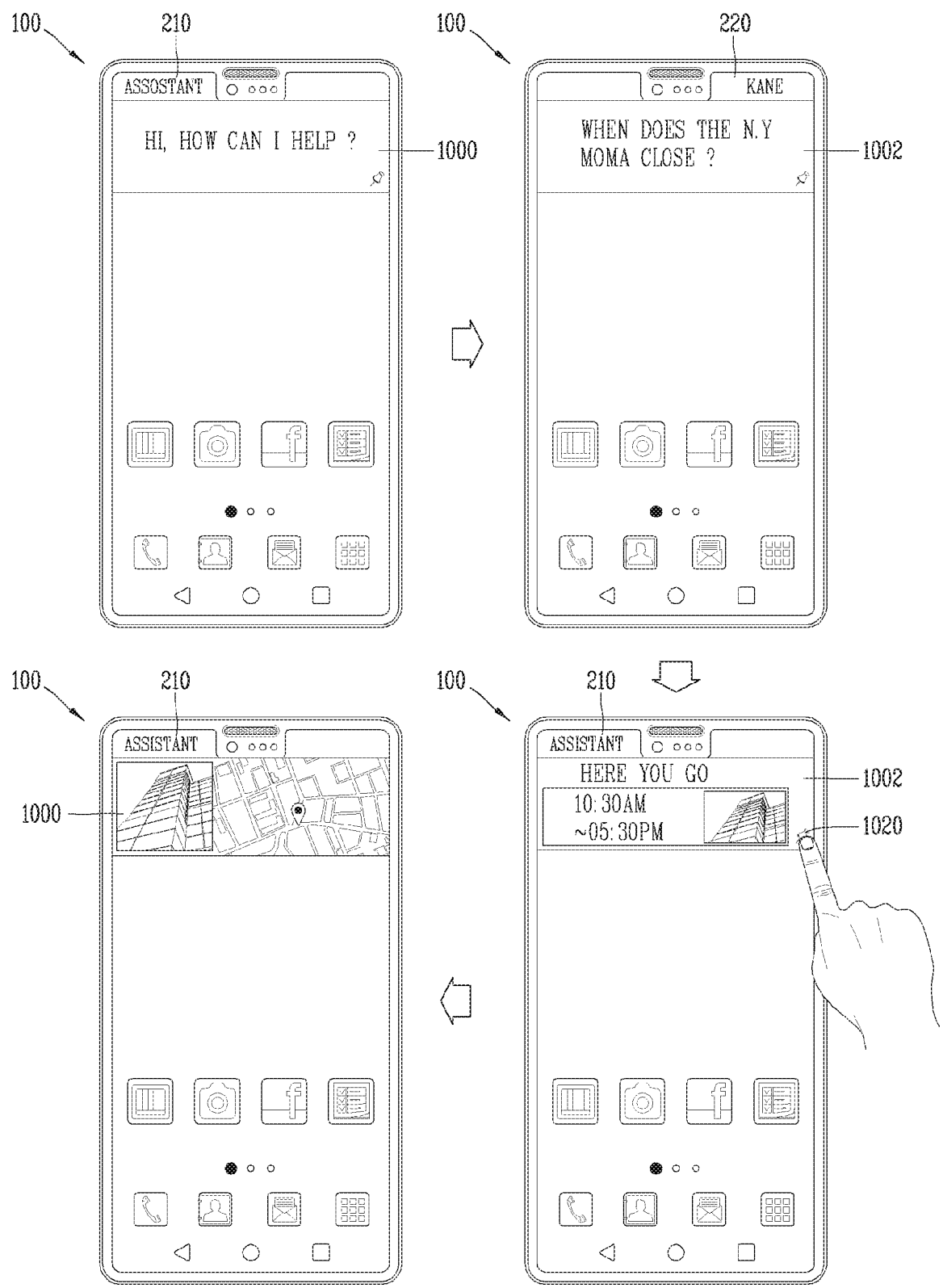
FIG. 10 is a view illustrating an example of displaying information related to a currently executed function through sub-regions in a mobile terminal according to the present disclosure.

Reference is now made to FIGS. 1A to 10, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an interlayered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

In addition, the controller 180 may control at least some of the components illustrated in FIG. 1A to drive an application program stored in the memory 170. In addition, the controller 180 may combine at least two or more of the components included in the mobile terminal 100 and operate the same to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Hereinafter, the components enumerated above will be described in more detail with reference to FIG. 1A, before explaining various embodiments implemented through the mobile terminal 100 as described above.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof. The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner. Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, a mobile terminal according to an embodiment of the present disclosure discussed above with reference to FIG. 1A, a mobile terminal in which components thereof are disposed, or a structure of a mobile terminal will be described with reference to FIGS. 1B and 10.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body can be understood as a concept of referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 10. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the second camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (See FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

[Definition of Notch Region]

Meanwhile, the display unit 151 of the mobile terminal 100 according to an embodiment of the present disclosure may be formed in a notch design as described above. The notch design may refer to a scheme in which the display unit 151 is formed such that image information may be displayed in the entire region excluding bezel regions in which left and right bezels are formed and a region in which at least one sensor and an output unit are formed in a front part of the mobile terminal 100.

Here, the at least one sensor may include at least one of a camera 121a (optical sensor), a proximity sensor, and an illuminance sensor, and the output unit may include at least one of an optical output unit 154, an audio output unit (or speaker) 152a, and the like. Accordingly, the notch design may be a mobile terminal in which the entire region of the front part of the mobile terminal, excluding the region in which the at least one sensor and the output unit are formed and the left and right bezel regions, are formed as a display unit in the front part of the mobile terminal. That is, the notch design type display unit may refer to a display unit in which a display region extends to display image information even in regions between the left and right bezel regions formed on the front part of the mobile terminal based on one region in which the at least one sensor is disposed at the upper end portion of the display unit.

Meanwhile, the controller 180 may classify (or divide) the extended display region (hereinafter, referred to as a sub-region) into different regions. For example, the controller

180 may classify the sub-regions based on one region in which the at least one sensor is disposed. Accordingly, the region where the at least one sensor (and the output unit) are disposed may be a 'reference region' for classifying the sub-regions or a 'central region' indicating the center of the sub-regions.

Meanwhile, the notch type display unit may be a display unit in which such that one region corresponding to the reference region at the upper end of the display unit is recessed toward a main region in which an execution screen currently executed in the mobile terminal is displayed so that the at least one sensor (and output unit) may be disposed. Thus, at the upper end of the display unit, the one region recessed toward the main region such that the at least one sensor may be disposed in the upper end of the display unit may also be referred to as a 'notch region'.

Hereinafter, for the purposes of description, the region where the at least one sensor and the output unit are disposed, which may be termed as the 'reference region', the 'central region', or the 'notch region', will be referred to as the 'notch region'.

Meanwhile, the controller 180 may classify the plurality of sub-regions based on the notch region. For example, the controller 180 may classify the left region of the notch region, as a first region. Further, the controller 180 may classify the right region of the notch region, as a second region. Alternatively, the controller 180 may classify the notch region as a separate region. In this case, the controller 180 may classify the upper end of the display unit into three regions, i.e., the first region, the second region, and the notch region.

Meanwhile, each of the classified regions may be used as different operation regions. In this case, the controller 180 may sense a touch gesture applied to at least one of the classified regions and perform a function corresponding to either a start point or an end point of the touch gesture. Or, the controller 180 may perform a function corresponding to a sub-region or the notch region to which the touch gesture is applied. Here, the classified regions may correspond to different functions. Accordingly, the controller 180 may perform different functions based on the start point or the end point of the touch gesture, or a region to which the touch gesture is applied. Or, the controller 180 may perform different controls on a currently executed function.

Meanwhile, the controller 180 may classify a touch gesture applied to each region according to the type of the applied touch gesture. In this case, although touch gestures are applied to the same region, the controller 180 may determine the touch gestures as different inputs according to identified types of the touch gestures. Here, the different inputs may refer to inputs processed according to different applications. Or, the different inputs may refer to inputs processed for different controls for a specific function.

Meanwhile, the controller 180 may classify the display unit 151 into the sub-regions and the main region. Here, the main region may be a region in which an execution screen related to a currently executed function is executed is displayed in the mobile terminal 100.

Meanwhile, the sub-region may further include a partial region of the adjacent main region. That is, at least a portion of the main region may be displayed to extend from the sub-region, and the extended region may be displayed to be connected with the sub-region so as to be distinguishable from other portions of the main region.

Then, the controller 180 may display the extended region as a region connected to one of the sub-regions (e.g., the first region or the second region). Alternatively, the controller 180 may classify the extended region into a plurality of regions, and display the extended regions as regions connected to the classified sub-regions.

Meanwhile, the extended region may display information related to the connected sub-region. Thus, the main region of the display unit 151 may display an execution screen related to a function currently being executed in the mobile terminal 100 and information related to the sub-region simultaneously or together.

For example, the main region may be divided into a region extending from the sub-region and a region where the execution screen is displayed. In this case, the extended region may display information related to any one of the sub-regions, and the execution screen may be displayed in the other region excluding the extended region in the main region. Or, the extended region may be a region overlapping a portion of the main region. In this case, the information related to any one of the sub-regions may be displayed in an overlapping manner in the region in which the execution screen is displayed.

Figure 1D:
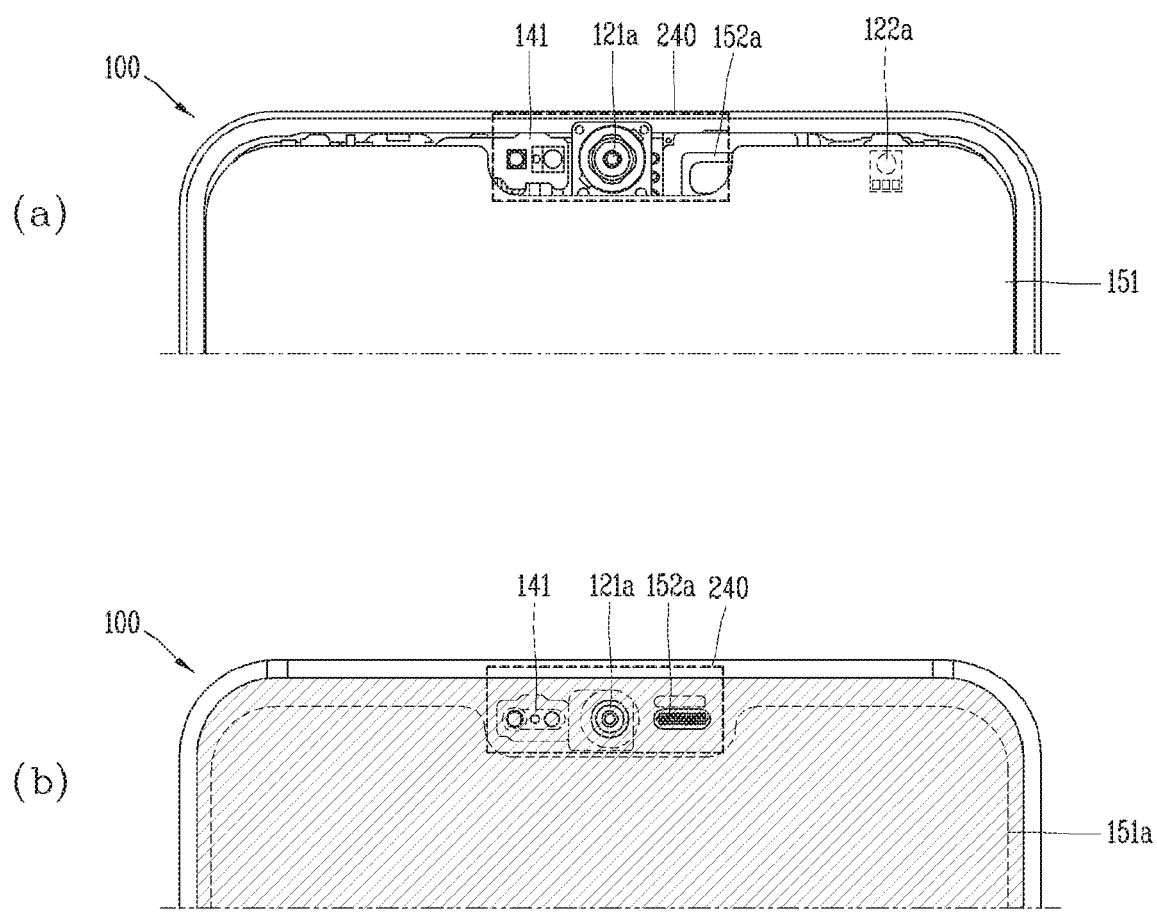
FIGS. 1D and 1E are conceptual views illustrating an example in which sub-regions and a notch region are formed in a mobile terminal related to the present disclosure.

Meanwhile, in the display unit 151 of the mobile terminal related to the present disclosure, a shape and an arrangement structure of a notch region and sub-regions may be variously modified according to forms in which at least one sensor (and output unit) formed at an upper end is formed. FIG. 1D is a conceptual view illustrating another example of the sub-regions and notch-region in a mobile terminal related to the present disclosure.

As illustrated in (a) of FIG. 1D, the display unit 151 of the mobile terminal according to the present disclosure is formed such that a central region at an upper end of the display unit is recessed, and this region may be referred to as a 'notch region 240'. Also, the proximity sensor 141, the first camera 121*a*, and the first output unit 152*a* may be sequentially arranged in the recessed region, that is, the notch region 240. Here, at least one of the proximity sensor 141, the first camera 121*a*, and the first audio output unit 152*a* disposed in the notch region 240 may be at least partially covered by the display unit 151.

Meanwhile, as illustrated in (b) of FIG. 1D, a window 151*a* formed to cover the display unit 151 may be disposed on the front surface of the terminal body.

Here, the window 151*a* may be mounted on the front case 101 to form the front surface of the terminal body, and the window 151*a* may be form of a transparent material such as tempered glass.

Accordingly, as illustrated in (b) of FIG. 1D, the window 151*a* may be formed to cover at least one of the proximity sensor 141, the first camera 121*a*, and the first audio output unit 152*a*. For example, at least a portion of the first audio output unit 152*a* may be covered by the window 151*a*.

As illustrated in (a) of FIG. 1D, a microphone 122*a* may be additionally disposed at an upper end region of the terminal, and the microphone 122*a* may be covered by the display unit 151.

Figure 1E:

FIG. 1E illustrates an example in which various types of information are displayed through the above-mentioned sub-regions in the mobile terminal illustrated in FIG. 1D. Here, the types of information displayed in the sub-regions may be various indicators (or graphic objects).

As illustrated, the upper end region of the display unit 151 according to the present disclosure may be divided into a plurality of sub-regions 201, 202, and 203 with respect to the notch region 240. Different types of information may be displayed in the plurality of regions.

A left region may be divided into first and second sub-regions 201 and 202 with respect to the notch region 240, and information regarding a current time may be displayed in the first sub-region 201 formed on the left side of the upper end of the display unit 151 with respect to the notch region 240.

In the second sub-region 202 disposed between the first sub-region 201 and the notch region 240, various types of notification information related to an event that occurs in the mobile terminal may be displayed. Such event information may be displayed for a predetermined time when the event occurs, and disappear after the lapse of a predetermined time.

Meanwhile, if a touch is sensed while the event information is displayed in the second sub-region 202, the controller may output an execution screen of an application corresponding to the event information displayed in the second sub-region 202 on the display unit.

Meanwhile, a third sub-region 203 may be formed on the right side of the upper end of the display unit 151 with respect to the notch region 240. Notification information related to at least one of various state information and system information of the current mobile terminal may be displayed in the third sub-region 203. For example, as illustrated in FIG. 1E, information related to a current battery state of the mobile terminal, a current radio signal reception state of the mobile terminal, a state of being connected to a data network such as Wi-Fi, and a type of a connected data network may be displayed in the third sub-region 203.

Hereinafter, an example in which the sub-regions are formed and a driving state of the sub-regions and the main region will be described in more detail with reference to FIGS. 2A to 2D.

Figure 2A:
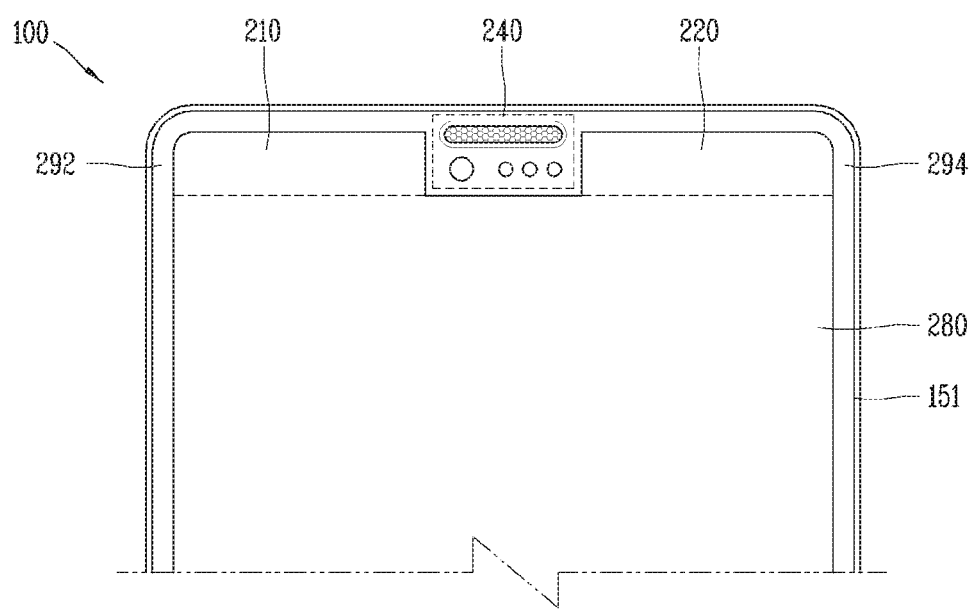
FIGS. 2A to 2D are conceptual diagrams for explaining driving states of sub-regions and a main region formed at an upper end of a display unit according to a notch design in a mobile terminal according to the present disclosure.

First, FIG. 2A illustrates an example in which the controller 180 classifies the display unit 151 into a plurality of regions in the mobile terminal 100 including the display unit 151 including sub-regions according to a notch design according to an embodiment of the present disclosure.

For example, the display unit 151 may extend from a notch region 240 in which at least one sensor and an output unit are formed to regions between left and right side bezel regions 292 and 294 formed on the front side of the mobile terminal. Thus, image information may be displayed even in a region between the notch region 240 and the left bezel 292 of the mobile terminal 100, i.e., a left side region 210 of the notch region 240 and even in a region between the notch region 240 and the right bezel 294 of the mobile terminal 100, i.e., a right side region of the notch region 240. Hereinafter, the left region 210 will be referred to as a first region and the right region 220 will be referred to as a second region.

Accordingly, as illustrated in FIG. 2A, the display unit 151 of the present disclosure may be classified into the first region 210, the second region 220, and the main region 280. Here, the main region 280 may be a region in which image information (e.g., an execution screen) related to a function currently being executed in the mobile terminal is displayed, as described above. As described above, the main region 280 may be a region having an interlayered structure with a touch sensor or integrally formed with a touch sensor to sense a user's touch input or touch gesture.

Meanwhile, the first region 210 and the second region 220 may be regions having an interlayered structure with a touch sensor or integrally formed with a touch sensor, like the main region 280 of the display unit 151. Thus, the first region 210 and the second region 220 may be formed to sense a touch input or the user's touch gesture applied thereto.

In this manner, the display unit 151 of the mobile terminal according to the present disclosure may include a plurality of display regions 210, 220, and 280. Here, the first and second regions 210 and 220 may have at least one of the same area and the same shape. Alternatively, the first and second regions 210 and 220 may have at least one of different areas and different shapes. Accordingly, the first region 210 or the second region 220 may have a larger area than the other region, or may have a different shape from the other region.

Meanwhile, the first and second regions 210 and 220 and the main region 280 may have a physically independent structure. In this case, the mobile terminal 100 may include a plurality of physically separated display units (e.g., three display units). When the plurality of physically separated display units are provided, the controller 180 may separately control the plurality of display units.

In this case, sub-controllers for controlling the display units may be allocated, respectively. That is, in the mobile terminal, the first region 210 may be controlled by a first sub-controller, and the second region 210 may be controlled by a second sub-controller. Also, the main region 280 may be controlled by a third sub-controller. The first, second, and third sub-controllers may be controlled by the controller 180. In another example, the physically classified first and second, and main regions 210, 220, and 280 may be controlled by a single controller, e.g., the controller 180.

Meanwhile, the first, second, and main regions 210, 220, and 280 may be included in the single display unit 151. That is, the single display unit 151 may include the plurality of display regions 210, 220, and 280. In this case, the boundaries between the plurality of display regions 210, 220 and 280 may be distinguished by software processing. In this case, the controller 180 may output a specific image to the boundary regions of the plurality of display regions 210, 220, and 280 to allow the user to recognize the boundaries of the plurality of display regions.

Meanwhile, in this case, each of the plurality of display regions 210, 220, and 280 may be independently controlled by software processing.

As described above, the mobile terminal according to the present disclosure may include a plurality of display regions (or a plurality of display units, which will be collectively referred to as a plurality of display regions hereinafter) through physical classification or software classification.

Meanwhile, in the present disclosure, regardless of whether the plurality of display regions are configured as a plurality of display units or a plurality of regions included in a single display unit, each region may be independently controlled to perform the same function or effect. Therefore, the following description will be made without distinguishing between whether the plurality of display regions are configured as a plurality of display units or whether the plurality of regions are included in a single display unit.

Meanwhile, the plurality of display regions may be controlled independently. Hereinafter, a method of controlling a plurality of display regions will be described in detail with reference to the accompanying drawings.

Figure 2B:
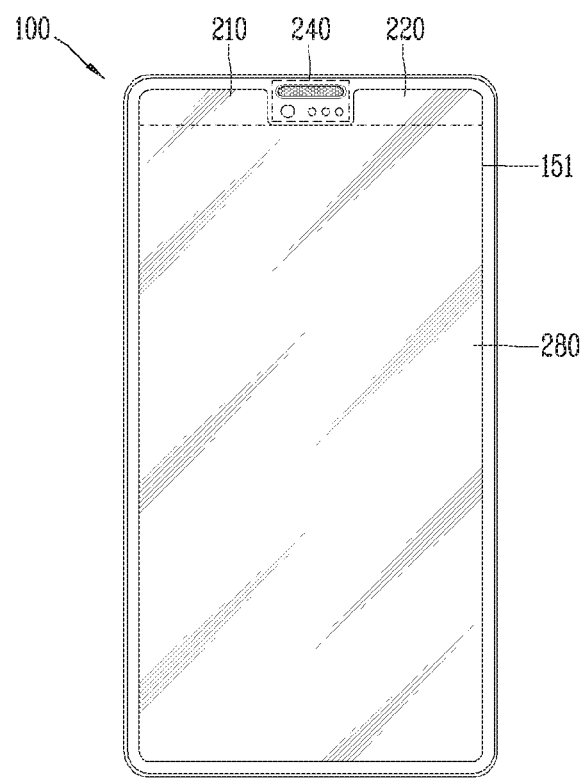
Figure 2C:
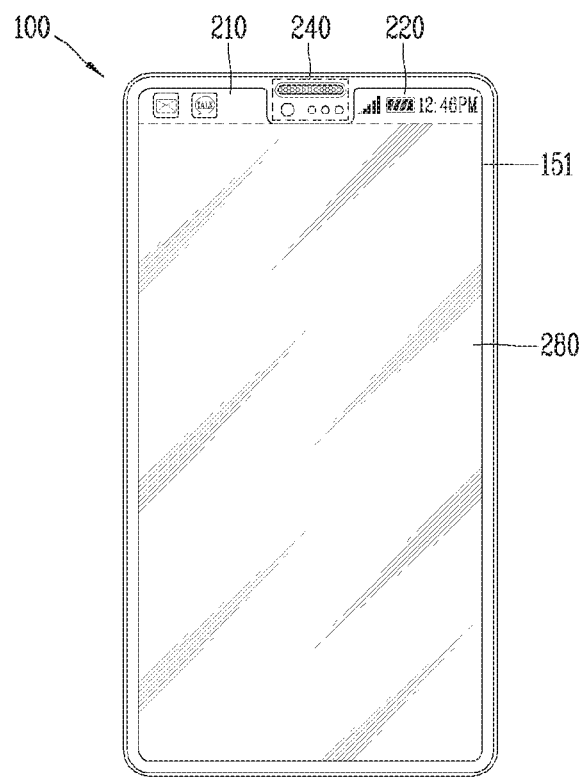
Figure 2D:

FIGS. 2B to 2D are conceptual diagrams for explaining driving states of the plurality of display regions in the mobile terminal according to the present disclosure.

In the mobile terminal according to the present disclosure, the plurality of display regions may have the same driving state or different driving states. For example, each of the plurality of display regions of the mobile terminal according to the present disclosure may be driven in either an active state or an inactive state.

Here, the active state may refer to a state in which visual information may be displayed and touch sensing may be performed. That is, the active state refers to a state in which the corresponding display region is turned on.

Furthermore, the inactive state may refer to a state in which displaying visual information is limited. That is, in this case, a lighting unit for illuminating the display unit is turned off. Meanwhile, in the present disclosure, the display region in the inactive state may be configured to enable touch sensing. That is, in the present disclosure, the inactive state refers to a state in which displaying visual information is limited and touch sensing is allowed. That is, in the inactive display region, the controller 180 may control the corresponding display region so that touch sensing may be performed.

Meanwhile, in the present disclosure, the inactive state in which displaying visual information is limited and touch sensing is allowed may be referred to as a doze mode. Therefore, the display region in the inactive state may be referred to as being in the 'dose mode'. In this case, the display region in the doze mode may be activated at every predetermined period.

Meanwhile, the touch sensor may sense the tabs applied to the display unit 151 in different manners in the inactive state (or the doze mode) and the active state. In addition, settings related to an operation of the touch sensor may be set to be different in the inactive state (or doze mode) and the active state.

First, referring to FIG. 2B, the first, second and main regions 210, 220, and 280 may all be in the inactive state. Here, at least one of the first, second, and main regions 210, 220, and 280 may allow touch sensing even when lighting is off. For example, any one of the first and second regions 210 and 220 may be configured to allow touch sensing even in the inactive state. In this case, when a predetermined type of touch is sensed in any one of the first and second regions 210 and 220, the controller 180 may output screen information corresponding to the touch on at least one of the first and second regions 210 and 220 or on the main region 280.

In another example, as illustrated in FIG. 2C, at least one of the first and second regions 210 and 220 may be active and the main region 280 may be inactive. That is, the first and second regions 210 and 220 and the main region 280 are controlled independently, and thus, they may have different driving states. Accordingly, a driving state of any one of the first and second regions 210 and 220 or the main region 280 does not affect a driving state of the other display region. That is, in the present disclosure, the plurality of display regions may always be active at the same time or may not always be inactive at the same time.

Further, in the mobile terminal according to the present disclosure, any one of the plurality of display regions may be always active. That is, in this case, the display region which is always active may be expressed as being always on. That is, at least one of the first, second, and main regions 210, 220, and 280 may be kept active at all times. In this case, the always-on target display region may also be driven in the inactive state depending on the amount of remaining battery capacity of the mobile terminal.

Meanwhile, in the present disclosure, in case where any one of the plurality of display regions is active and the other region is inactive, a touch applied to the display region in the inactive state may be processed as a control command for the active display region. For example, screen information displayed in the first region 201 or the second region 220 in the active state may be scrolled by a touch applied to the inactive main region 280.

In another example, as illustrated in FIG. 2D, the first, second, and main regions 210, 220, and 280 may all be active. Here, the first, second, and main regions 210, 220, and 280 may each be switched from the inactive state to the active state at the same time or at different times.

Meanwhile, the controller 180 may control the first, second, and main regions 210, 220, and 280 independently of each other. In this case, different pieces of screen information may be output on the first, second, and main regions 210, 220, and 280, respectively. That is, the information displayed on any one of the plurality of display regions may not affect the information displayed on the other.

For example, i) information related to a first application may be displayed in the first region 210, and ii) information related to a second application may be displayed in the second region 220. Also, iii) an execution screen of a third application may be displayed in the main region 280. In this case, a control command (e.g., a touch input) for controlling the information displayed in the first region 210 may not affect the information displayed in the second region 220 or the execution screen displayed in the main region 280. More specifically, when a touch for scrolling the displayed information is applied in the first region 210, the controller 180 may perform scrolling only on the information displayed in the first region 210 and may not perform scrolling on the information displayed in the second region 220 or on the execution screen displayed in the main region 280.

Meanwhile, the pieces of image information displayed in the first, second, and main regions 210, 220, and 280 may vary. Further, in case where the first, second, and main regions 210, 220, and 280 are all activated, the first, second, and main regions 210, 220, and 280 may be switched to an inactive state at different time points.

As described above, in the mobile terminal according to the present disclosure, the first, second, and main regions 201, 220, and 280 may have different driving states or the same driving state. Also, whether to drive any of the first, second, and main regions 201, 220, and 280 in an active state or whether to maintain any of them in an inactive state may be determined on the basis of a user selection or determined under the control of the controller 180.

Figure 3A:
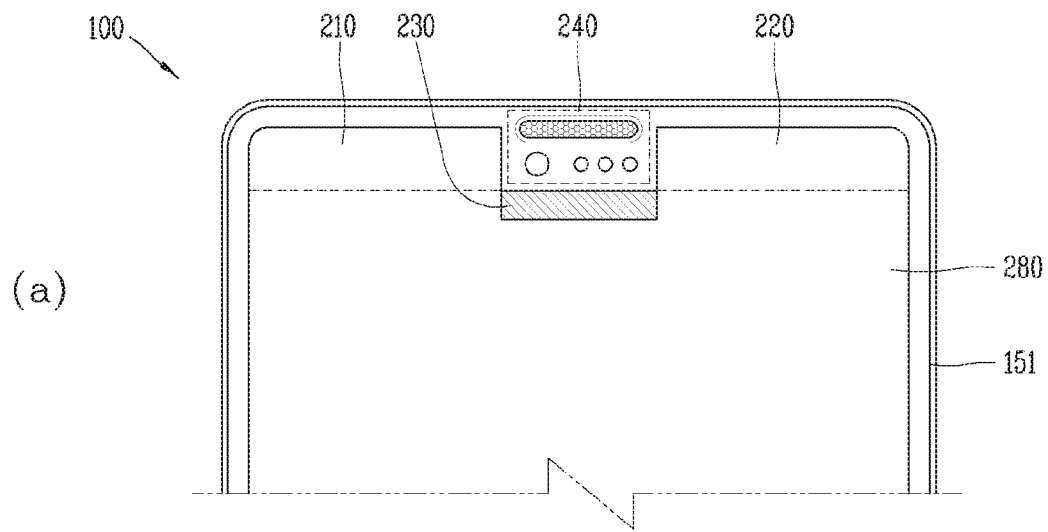
FIGS. 3A to 3C are conceptual diagrams for explaining sub-regions and the notch region in detail in a mobile terminal according to the present disclosure.
Figure 3A:
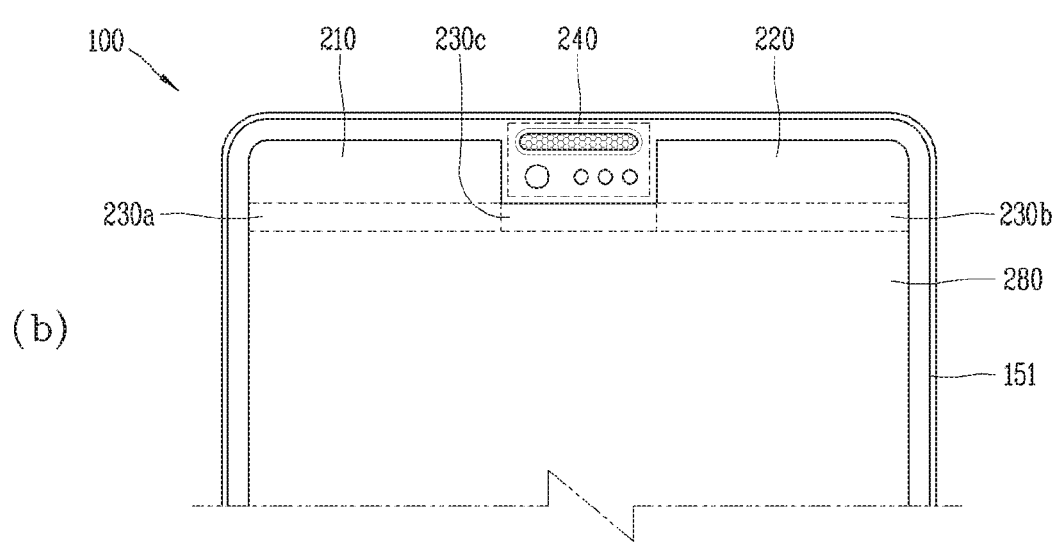
Figure 3B:
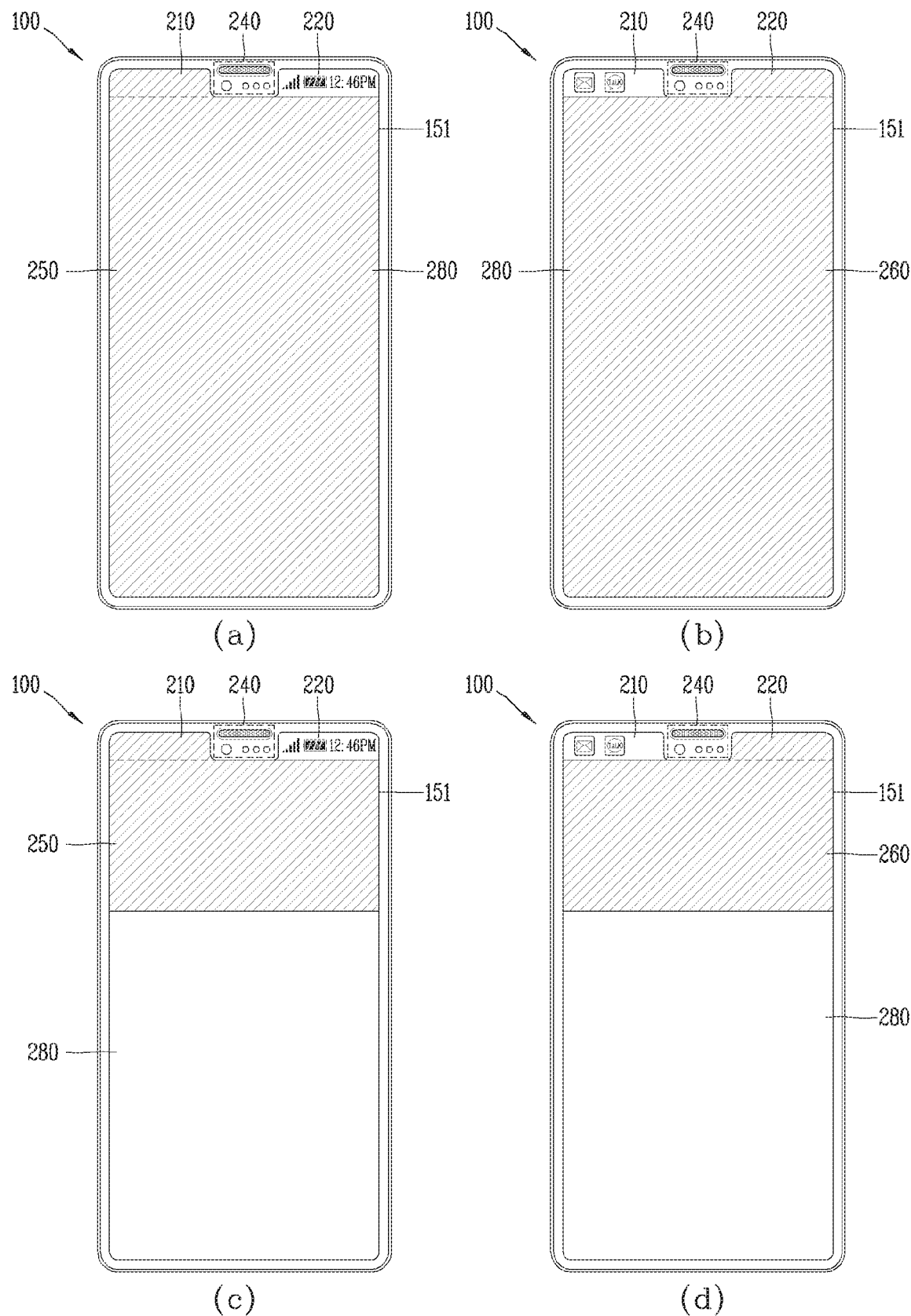
Figure 3C:
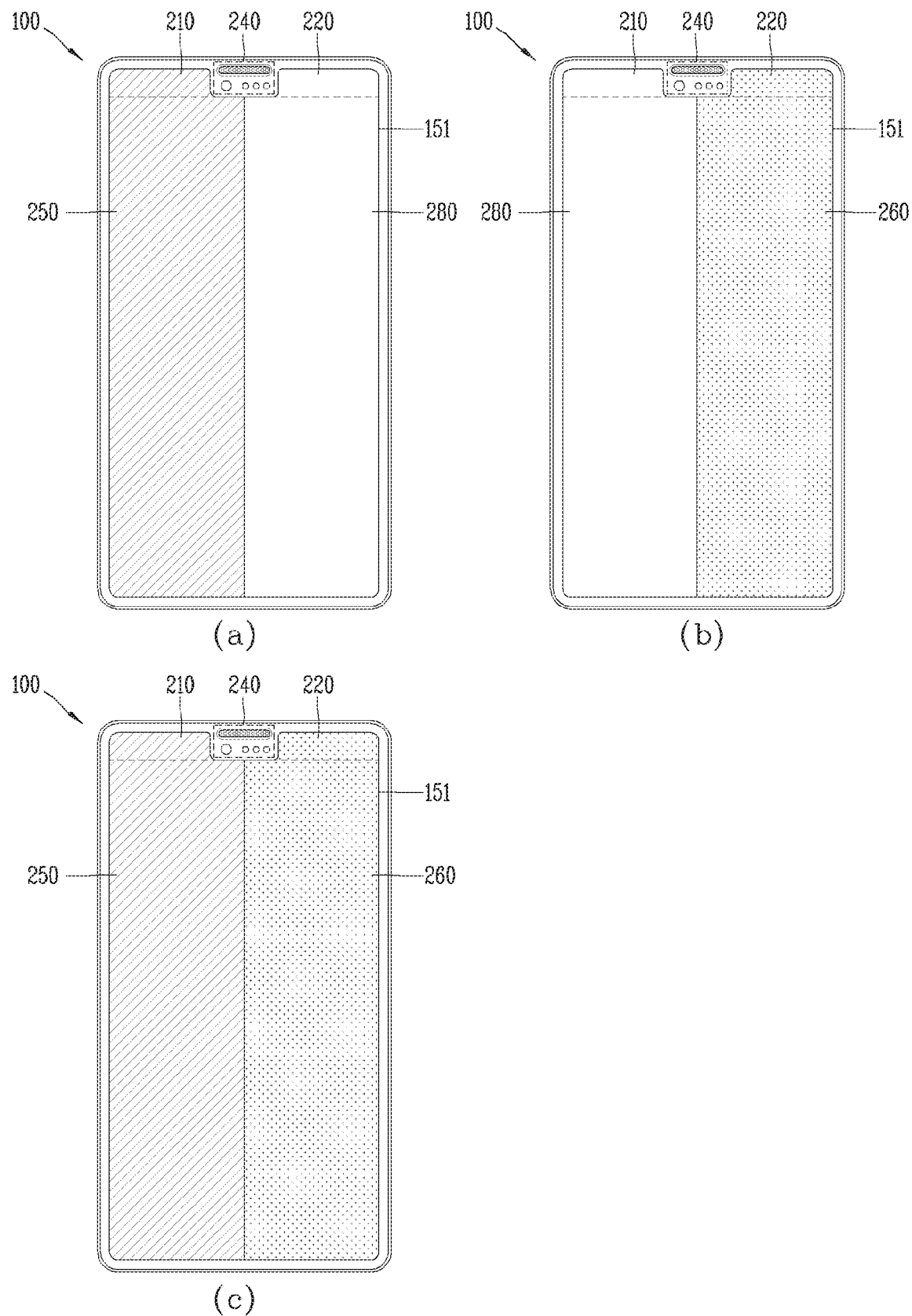

[FIGS. 3A to 3C: Implementation Examples of Sub-Region and Notch Region]

FIGS. 3A to 3C are conceptual diagrams for explaining the sub-regions and the notch region in more detail in the mobile terminal according to the present disclosure.

As described above, the display unit 151 of the mobile terminal 100 according to the present disclosure may be classified into the first region 210, the second region 220, and a main region 280. Also, the controller 180 may be configured to distinguish among touch inputs respectively applied to the first region 210, the second region 220, and the main region 280 and perform different functions according to the distinguished touch inputs or perform different controls on a currently executed function.

Meanwhile, at least one sensor is disposed between the first region 210 and the second region 220 and the notch region 240 is formed as a region recessed toward the main region 280 from the upper end of the display region. The controller 180 may allocate one region around the notch region 240 as a region for sensing a touch input applied to the notch region 240. FIG. 3A illustrates an example of such a case.

Referring to (a) of FIG. 3A, one region 230c of the display unit adjacent to the notch region 240 may be set as a region for sensing a touch input applied to the notch region 240. In this case, the one region 230c may be a boundary region 230 corresponding to the boundary between the notch region 240 and the main region 280. The controller 180 may distinguish between a touch input sensed in the boundary region 230 between the notch region 240 and the main region 280 and a touch input applied to the first and second regions 210 and 220. That is, the controller 180 may identify the notch region 240 as a separate operation region distinguished from the first and second regions 210 and 220 or the main region 280 through the boundary region 230. Accordingly, when a touch input is applied to the boundary region 230, a function different from those executed when a touch input is applied to the first and second regions 210 and 220 or the main region 280 may be executed.

Meanwhile, the boundary region may extend to a region corresponding to the boundary between the first region 210 and the main region 280 and the boundary between the second region 220 and the main region 280, as well as to the boundary between the notch region 240 and the main region 280. That is, as illustrated in (b) of FIG. 3A, a first boundary region 230*a* may be formed between the first region 210 and the main region 280, a second boundary region 230*b* may be formed between the second region 220 and the main region 280, and a third boundary region 230*c* may be formed between the notch region 240 and the main region 280.

Here, the first and second boundary regions 230*a* and 230*b* may complement the narrow width of the first region 210 and the second region 220. Accordingly, a size of the touch input region corresponding to the first region 210 or the second region 220 may be extended by the width of the boundary regions 230*a* and 230*b*. That is, the first region 210 and the second region 220 may be extended by the regions corresponding to the boundary regions 230*a* and 230*b*. Therefore, although the widths of the first region 210 and the second region 220 are narrow, the user may easily apply a touch input to the first region 210 or the second region 220 through the boundary region. Meanwhile, the boundary regions 230*a*, 230*b*, and 230*c* may have a predetermined width, and the width may be changed according to a user selection. Also, the boundary regions 230*a*, 230*b*, and 230*c* may have the same width as illustrated in FIG. 3A, or may have different widths.

Meanwhile, if a touch input is applied to either the first region 210 or the second region 220, the controller 180 may display information related to a portion of the touch input-applied sub-region (first region 210 or second region 220) or the main region 280. FIG. 3B illustrates an example of a region in which information related to the sub-region is displayed on the main region 280 in such a case.

In case where a preset touch input is applied to any one of the sub-regions, the controller 180 may display information, related to information displayed in the sub-region, in at least a portion of the main region 280. That is, as illustrated in (a) and (b) of FIG. 3A, information related to the information displayed in the first region 210 or the second region 220 may be displayed in the entire region of the main region 280.

For example, in case where different types of event notification information are displayed respectively in the first region 210 and the second region 220, the controller 180 may display an execution screen of an application according to event notification information displayed in any one of the sub-regions according to which of the sub-regions is selected.

That is, when the first region 210 is selected, an execution screen of an application corresponding to the event notification information displayed in the first region 210 may be displayed in the entire region of the display unit 151 as illustrated in (a) of FIG. 3B. In this case, the entire main region 280 may be a first display region 250 in which the information related to the first region 210 is displayed. Meanwhile, when the second region 220 is selected, an execution screen of an application corresponding to event notification information displayed in the second region 220 may be displayed in the entire region of the display unit 151 as illustrated in (b) of FIG. 3B. In this case, the entire main region 280 may be the second display region 260 in which information related to the second region 220 is displayed.

Meanwhile, the first and second display regions 250 and 260 illustrated in (a) and (b) of FIG. 3B may be changed in size according to a user selection. For example, the controller 180 may change the size of the first and second display regions 250 and 260 on the basis of a touch input applied to a region of the display unit 151, e.g., a region corresponding to the boundary between the display unit 151 and the bezel region formed at a lower end of the front surface portion of the mobile terminal. (c) and (d) of FIG. 3B illustrate examples in which the sizes of the first and second display regions 250 and 260 are changed based on a touch input.

Meanwhile, the controller 180 may display pieces of information related to the sub-regions (first region 210 and second region 220) only in a portion of the main region 280 on the basis of a touch input applied to any one of the sub-regions (first region 210 and second region) as illustrated in (c) and (d) of FIG. 3B. In this case, the controller may change sizes of the first and second display regions 250 and 260 on the basis of a user's touch input (or touch gesture).

Here, a touch input for changing the sizes of the first and second display regions 250 and 260 may be a touch input applied to a boundary of the first and second display regions 250 and 260, preferably, a lower boundary of a region of the main region 280 in which the first and second display regions 250 and 260 are displayed.

Meanwhile, when a touch input is applied to at least one of the sub-regions 210 and 220, the controller 180 may display information related to the touch input-applied sub-region in a partial region of the main region 280 corresponding to the touch input-applied sub-region. Here, a partial region of the main region 280 corresponding to the sub-region may be a region corresponding to a position of the sub-region in one direction. More preferably, the partial region of the main region 280 corresponding to the sub-region may be a region corresponding to the position of the sub-region in a length direction. (a) to (c) of FIG. 3C illustrates examples of such a case.

First, referring to (a) of FIG. 3C, (a) of FIG. 3C illustrates an example in which a touch input is applied to the first region 210. That is, when a touch input of the user is applied to the first region 210, the controller 180 may generate the first display region 250 corresponding to the position of the first region 210 in the length direction in the main region 280 as illustrated in (a) of FIG. 3C.

Information related to the first region 210, i.e., execution screen information of an application corresponding to notification information displayed in the first region 210, a control menu screen of functions corresponding to the first display region 250, and the like, may be displayed in the first display region 250. For example, if a function of displaying a control menu of a function currently executed in the mobile terminal corresponds to the first region 210, the controller 180 may display the control menu of the function currently executed in the mobile terminal in the first display region 250 formed to correspond to the position of the first region 210.

Then, the controller 180 may display the control menu according to the function currently executed in the mobile terminal and the execution screen of the currently executed function together in the main region 280. In this case, as illustrated in (a) of FIG. 3C, the controller 180 may divide the main region 280 to display the control menu in a portion (first display region 250) and the execution screen in the other portion (remaining region excluding the first display region 250). Alternatively, the controller 180 may display the control menu at a position corresponding to the first region 210 on the main region 280 in which the execution screen is displayed, in an overlapping manner.

Meanwhile, (b) of FIG. 3B illustrates an example in which a touch input is applied to the second region 220. That is, when a touch input of the user is applied to the second region 220, the controller 180 may generate the second display region 260 corresponding to a position of the second region in the length direction in the main region 280 as illustrated in (b) of FIG. 3C.

The controller 180 may then display the information related to the second region 220, that is, the execution screen information of the application corresponding to the notification information displayed in the second region 220, the control menu screen of the function corresponding to the second region 220, and the like, in the second display region 260. In this case, as illustrated in (b) of FIG. 3C, the controller 810 may divide the main region 280 to display the control menu in a portion (the second display region 260) and the execution screen in the other remaining portion (remaining region excluding the second display region 260). Alternatively, the controller 180 may display the control menu at a position corresponding to the second region 220 in an overlapping manner on the main region 280 in which the execution screen is displayed.

Meanwhile, a first function corresponding to the first region 210 and a second function corresponding to the second region 220 may have different functions. For example, the first function may be a function to display a control menu related to a function currently being executed in the mobile terminal, and the second function may be a function to display a control menu related to a current system state of the mobile terminal.

Then, in case where a touch input is applied to each of the first region 210 and the second region 220, as illustrated in (c) of FIG. 3C, the controller 180 may display the first display region 250 in which the control menu related to the function currently executed in the mobile terminal is displayed and the second display region 260 in which the control menu related to the current system state of the mobile terminal, in portions of the main region 280 corresponding to the first and second regions 210 and 220. Thus, as illustrated in (c) of FIG. 3C, the main region 280 may be divided into a plurality of regions to display pieces of information respectively corresponding to the first region 210 and the second region 220, and in this case, information related to the first region 210 and information related to the second region 220 may be displayed together.

Meanwhile, in the present disclosure, the notch region 240 may be identified as a separate region distinguished from the first region 210 and the second region 220. In this case, the controller 180 may classify the main region 280 into regions 410, 420, and 430 corresponding to the first region 210, the second region 220, and the notch region 240. (a) and (b) of FIG. 4A illustrate these examples.

Figure 4A:
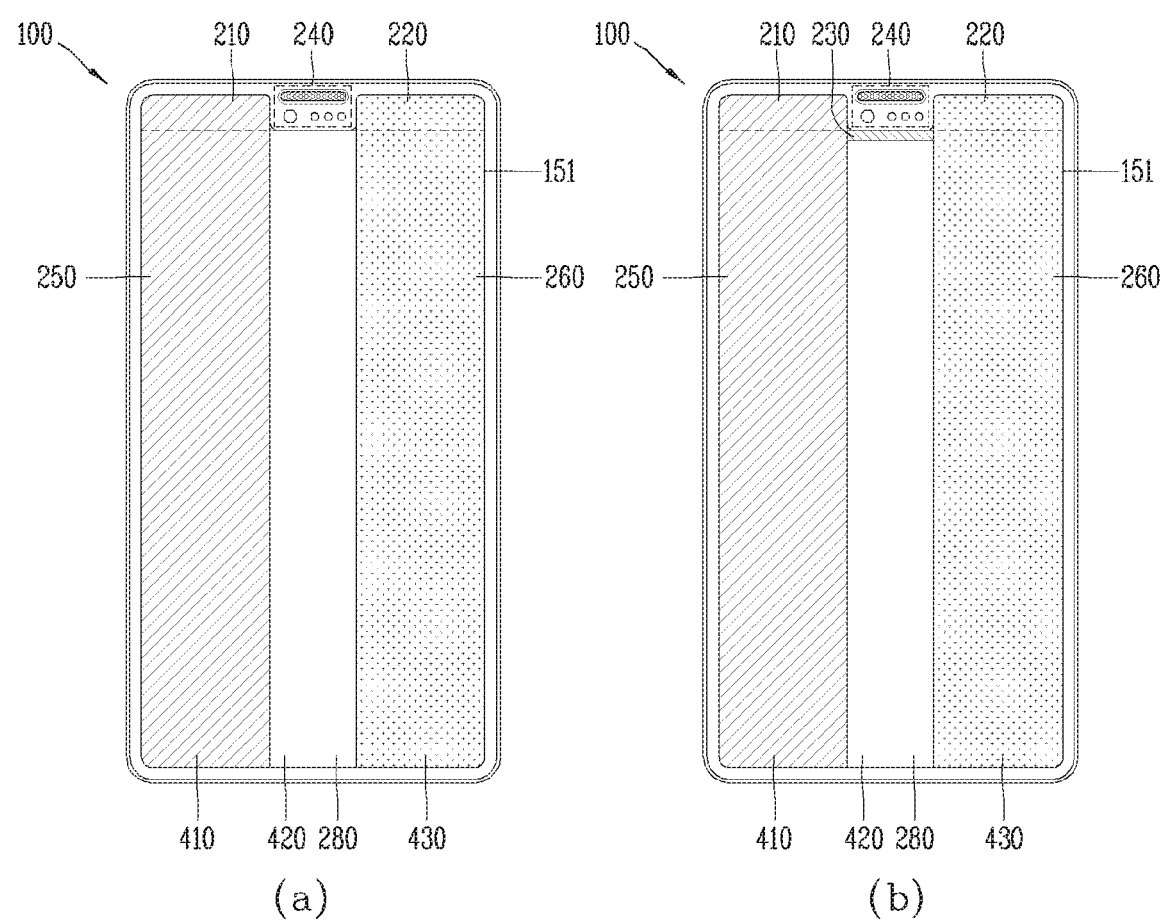
FIGS. 4A to 4C are conceptual diagrams for explaining regions of a display unit classified into a plurality of regions according to a notch region and sub-regions in a mobile terminal according to the present disclosure.

First, referring to (a) of FIG. 4A, in case where the main region 280 is classified into the regions 410, 420, and 430 corresponding to the first region 210, the second region 220, and the notch region 240 as described above, the first and second display regions 250 and 260 displaying information related to the first and second regions 210 and 220 respectively may be formed in the region 410 corresponding to the first region 210 and the region 420 corresponding to the second region 220. Thus, the region 420 corresponding to the notch region 240 may not be included in the first display region 250 and the second display region 260. Thus, as illustrated in (a) of FIG. 4A, although both the first display region 250 and the second display region 260 are displayed, at least a portion of an execution screen of a function currently executed in the mobile terminal may be displayed through the region 420 corresponding to the notch region 240.

Meanwhile, as described above, the controller 180 may sense a touch input applied to the notch region 240 through the boundary region formed between the notch region 240 and the main region 280. In this case, the controller 180 may identify the notch region 240 as a separate operation region and execute a function corresponding to the touch input applied to the notch region 240. In this case, the controller 180 may distinguish the touch input applied to the notch region 240 and the region 420 corresponding to the notch region from a touch input applied to the first region 210 and the region 410 corresponding to the first region 210 and a touch input applied to the second region 220 and the region 430 corresponding to the second region 220 such that different functions may be executed or different controls may be performed.

Figure 4B:
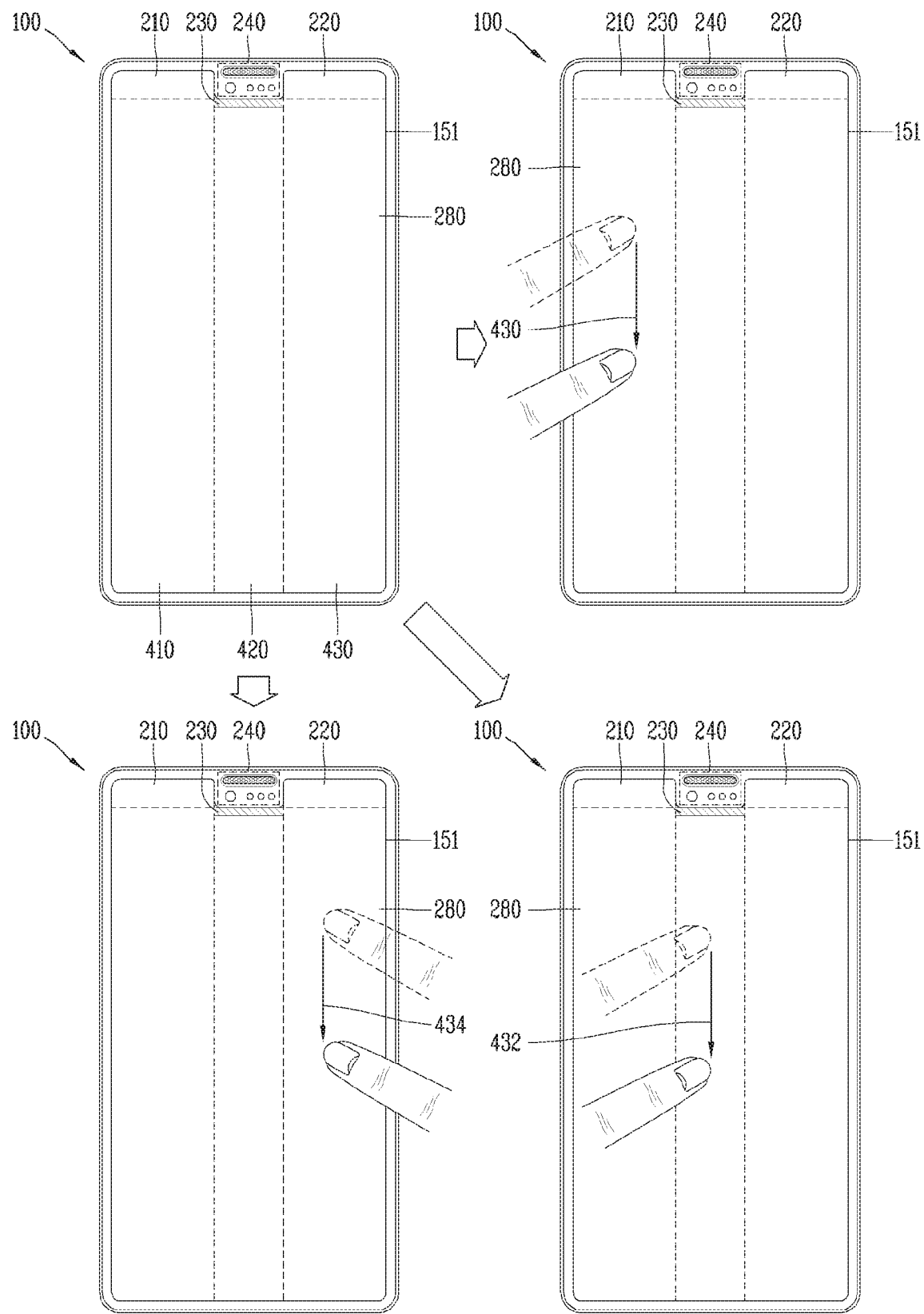

Meanwhile, the controller 180 may identify a touch input applied to each of the classified regions 410, 420, and 430 of the main region 280, as a touch input applied to any one of the sub-regions 210 and 220 and the notch region 240. FIG. 4B illustrates an example of such a case. In the following description, "first diagram" is a figure at the upper left portion, "second diagram" is a figure at the upper right portion, "third diagram" is a figure at the lower right portion, and "fourth diagram" is a figure at the lower left portion.

Referring to FIG. 4B, the first diagram illustrates an example in which the display unit 151 is divided into the sub-regions (first region 210 and second region 220) and the main region 280, and the main region 280 is divided into regions 410, 420, and 430 corresponding to the sub-regions 210 and 220 and the notch region 240, respectively.

In this case, the controller 180 may identify touch inputs applied to the respective regions 410, 420, and 430 of the main region 280 divided into a plurality of regions, as a touch input for any one of the sub-regions 210 and 220 and the notch region 240.

For example, as illustrated in the second diagram of FIG. 4B, when a touch input is applied to the region 410 corresponding to the first region 210, the controller 180 may recognize the applied touch input as a touch input for the first region 210. Thus, the controller 180 may display information, which is displayed in the first region 210, in the main region 280 or may execute an application or a function corresponding to notification information displayed in the first region 210 and display a corresponding execution screen in the main region 280.

Similarly, as illustrated in the fourth diagram of FIG. 4B, when a touch input is applied to the region 420 corresponding to the second region 220, the controller 180 may execute information, an application, or a function corresponding to the second region 220 and display a corresponding execution screen in the main region 280.

Meanwhile, as illustrated in the third diagram of FIG. 4B, when a touch input is applied to one region 410 of the main region corresponding to the notch region 240, the controller 180 may recognize the applied touch input as a touch input applied to the notch region 240. Thus, the controller 180 may execute a function or an application corresponding to a case where a touch input is applied to the notch region 240, and display a corresponding execution screen in the main region 280.

Figure 4C:
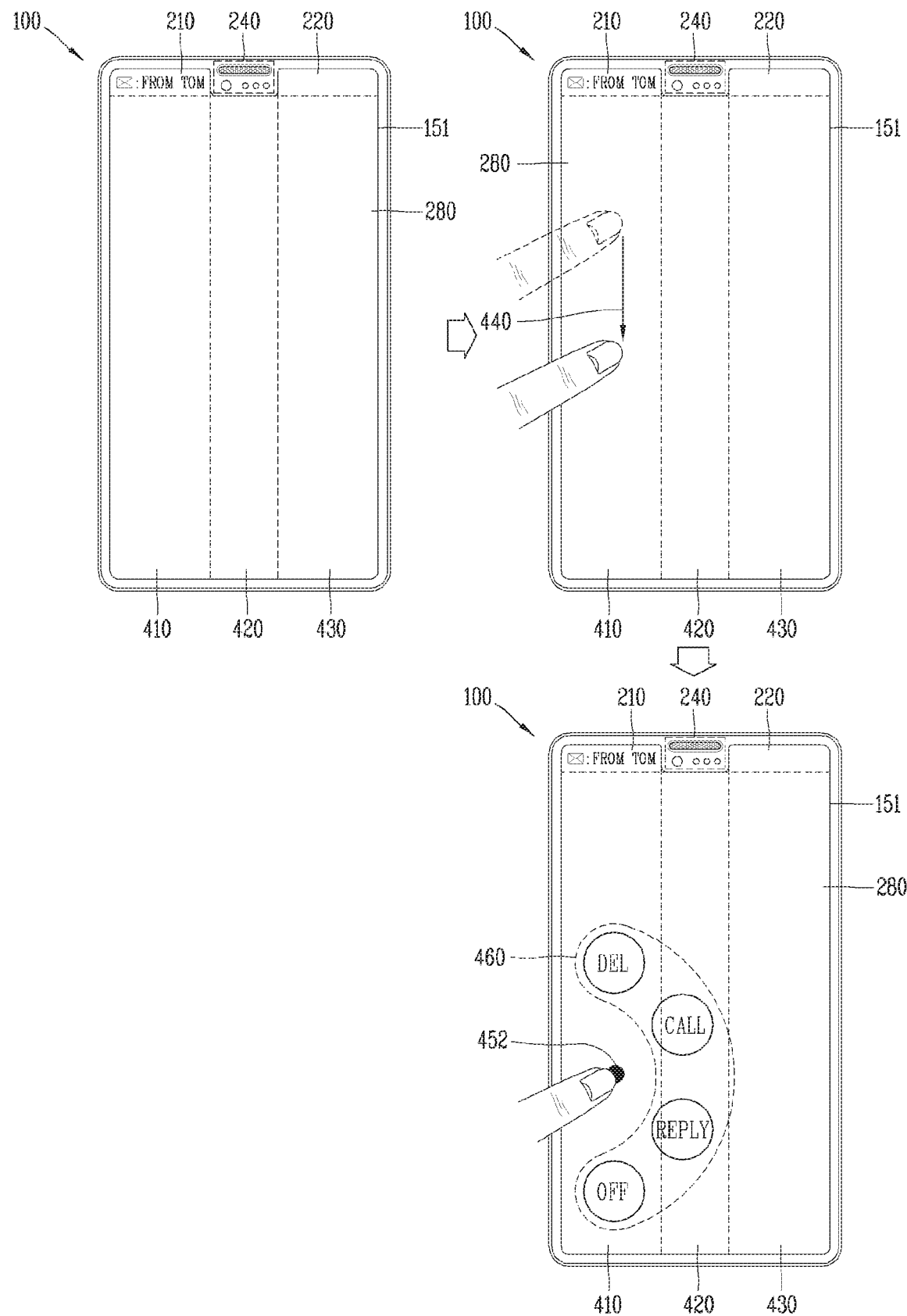

Meanwhile, when a touch input is applied to the regions 410, 420, and 430 of the main region 280 corresponding to the sub-regions 210 and 220 and the notch region 240, the controller 180 may cause any one of functions related to a function corresponding to each of the sub-regions 210 and 220 or the notch region 240 to be executed or perform a different control according to the touch input. FIG. 4C illustrates an example of such a case.

Referring to FIG. 4C, an example in which the main region 280 is divided into regions corresponding to the sub-regions 210 and 220 and the notch region 240 and notification information regarding a received message is displayed is illustrated. In this case, as illustrated in the first diagram of FIG. 4C, the notification information may be displayed in any one of the sub-regions 210 and 220, for example, the first region 210.

In this state, as illustrated in the second diagram of FIG. 4C, the controller 180 may sense a touch input 440 applied to the region 410 corresponding to the first region 210 among the divided regions of the main region 280. Here, the touch input may be a touch input according to a predetermined touch gesture. For example, the predetermined touch gesture may be a touch gesture for making a distance at which the touch input is dragged be equal to or greater than a predetermined distance.

Meanwhile, when the touch input 440 is applied to one region 410 of the main region 280 corresponding to the first region 210, the controller 180 may recognize the touch input 440 as a touch input applied for the notification information displayed in the first region 210. Accordingly, the controller 180 may execute a function regarding the notification information displayed in the first region 210.

In this case, the controller 180 may allow the user to select any one of the different functions related to the function corresponding to the notification information displayed in the first region 210.

That is, if the touch input is a touch input according to the predetermined touch gesture, the controller 180 may display at least one function icon 460 related to a function corresponding to the notification information displayed in the first region 210 or at least one control icon 460 corresponding to different control methods in the main region 280. Here, the at least one icon 460 may be displayed on the periphery of a point on the display unit 151 where the touch input is terminated.

The controller 180 may perform a specific function according to a user selection of the at least one icon 460. Or, the controller 180 may perform different controls on the currently executed function.

Figure 5:
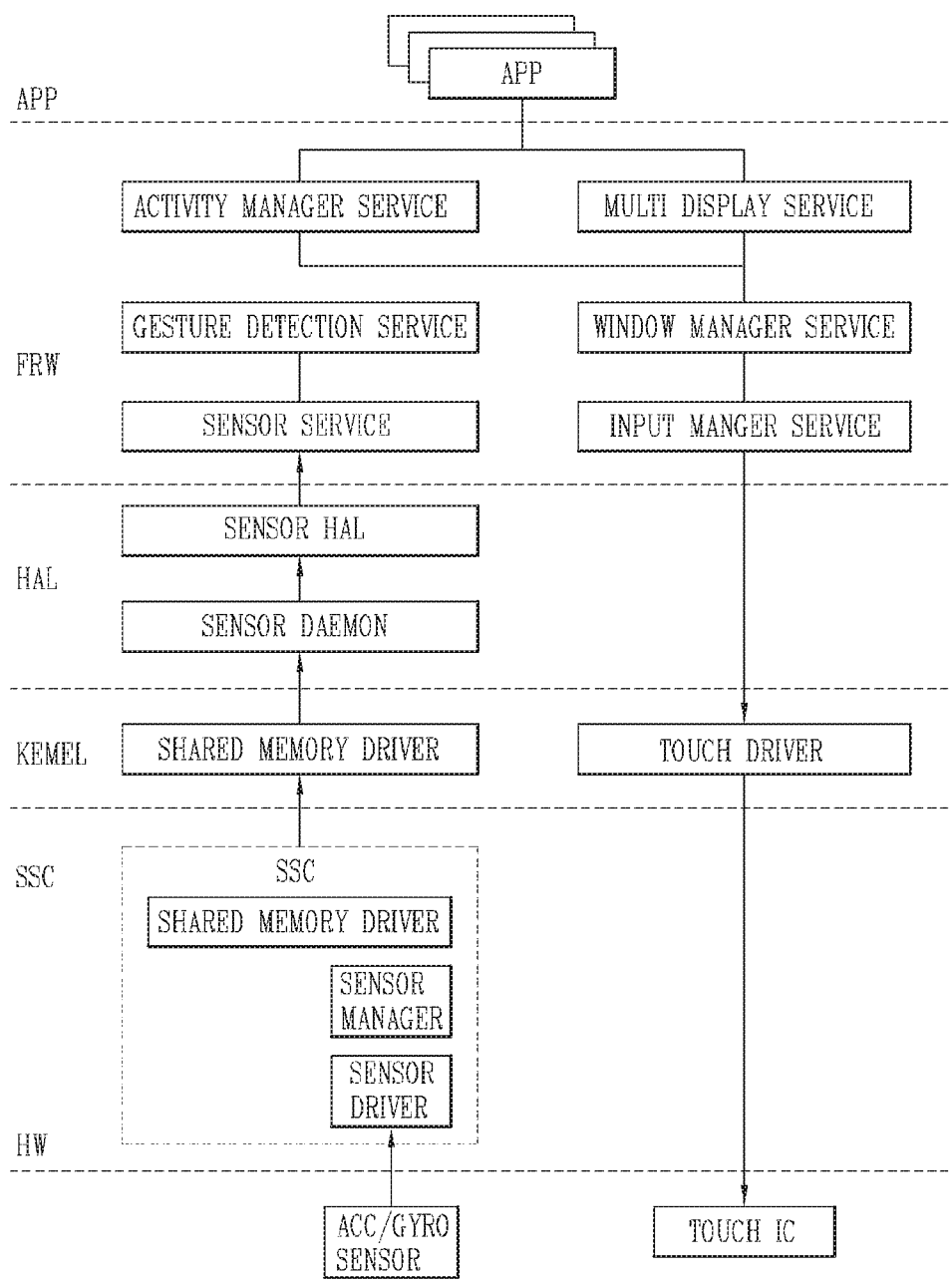
FIG. 5 is a conceptual diagram for explaining a software structure for recognizing an input applied through sub-regions as an input of a specific function in a mobile terminal according to the present disclosure.

Meanwhile, FIG. 5 is a conceptual diagram for explaining a software structure for recognizing an input applied through sub-regions, as an input of a specific function in a mobile terminal according to the present disclosure.

Referring to FIG. 5, a gesture detection service may recognize a user's operation of touching the mobile terminal 100 by sensing a touch input using an acceleration sensor or a gyro sensor. In this case, the gesture detection service may recognize the touch operation based on a result detected by an optical sensor (e.g., a camera unit) or a proximity sensor as well as an input from a touch sensor. Therefore, even when a gesture in which a touch object does not touch the display unit 151 is detected as an air gesture type such as hovering, it may be recognized as a touch event.

Meanwhile, when the gesture detection service detects the occurrence of a touch event, a window manager service may determine an activation region. Here, the activation region may refer to a region in which a touch input according to the touch event is applied to an application or a program. Accordingly, any one of the sub-regions of the display unit 151 or an extended region connected to any one of the sub-regions may be determined as an active region. Then, the input manager service may transfer the touch input corresponding to the sensed touch event, as an input for the currently activated region, to an application corresponding to the activated region.

Hereinafter, embodiments related to a control method that may be implemented in a mobile terminal configured as above will be described with reference to the accompanying drawings. It will be apparent to those skilled in the art that the present disclosure may be embodied in other specific forms without departing from the spirit or essential characteristics thereof.

Figure 6:
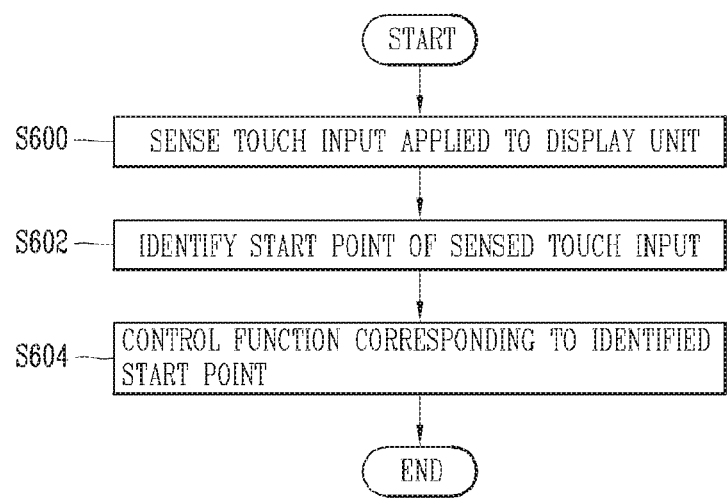
FIG. 6 is a flowchart illustrating an operation process of displaying different functions and corresponding image information on the basis of a touch gesture sensed in a sub-region in a mobile terminal according to the present disclosure.

FIG. 6 is a flowchart illustrating an operation process in which different functions and corresponding image information are displayed based on a touch gesture sensed in a sub-region in a mobile terminal according to the present disclosure.

First, the controller 180 of the mobile terminal 100 according to the embodiment of the present disclosure may detect a touch input applied to the display unit 151 according to the notch design (S600). Here, the touch input may be applied through a predetermined touch gesture.

Meanwhile, if the touch input is applied, the controller 180 may identify a start point of the sensed touch input, i.e., the touch gesture (S602). For example, the touch gesture may start from any one of the sub-regions 210 and 220 or from the notch region 240. That is, the touch gesture may be a touch gesture of dragging a touch input applied to any one of the sub-regions 210 and 220 or the notch region 240.

If the start point of the touch input is identified, the controller 180 may control a function corresponding to the identified start point of the touch input (S604). For example, the controller 180 may perform a function corresponding to one region, i.e., any one of the sub-regions or the notch region 240 corresponding to the start point of the touch input. Alternatively, the controller 180 may control a function currently executed in the mobile terminal differently according to the region corresponding to the start point.

Meanwhile, when a plurality of touch inputs are applied, the controller 180 may distinguish among the touch gestures for applying the touch inputs differently according to the types. Also, the mobile terminal 100 may be controlled differently based on the distinguished touch gesture and the region to which the touch gesture is applied. In this case, if the type of the sensed touch gesture to is different, different functions may be performed although the touch input is applied to the same region.

Here, the touch gesture may be variously classified according to types. For example, if touch gestures having different start points are applied as a result of the identifying in step S602, the touch gestures may be different. The controller 180 may perform different controls on the touch gestures having different start points.

First, the touch gesture may be a touch input applied to one point of the display unit 151 or a drag input to drag the touch input in one direction. When the touch gesture is a drag input, the touch gesture may be classified as a different input according to a direction of a trace in which the touch input is dragged.

For example, when the traces are formed in a horizontal direction and in a vertical direction, the controller 180 may classify them as different touch inputs. Also, when the touch gesture is a drag input, the touch gesture may be classified as a different input according to at least one of a start point position and an end point position of the trace in which the touch input is dragged. In this case, although a drag input that forms the same trace is applied, an application (or a program) to which an input according to the touch gesture is applied may be changed or a different control may be performed depending on the position of the start point or the end point. Or, a different function may be executed.

FIGS. 7A to 7E are conceptual diagrams illustrating an applied touch gesture in a mobile terminal according to the present disclosure.

The touch gesture may be classified as a touch gesture of applying different inputs depending on whether a touch input is applied to one point or whether a continuous drag is applied in one direction following the touch input. Also, in the case of a drag input, it may be classified as a different input according to a direction of a trace in which the touch input is dragged.

FIG. 7A illustrates an example of such types of touch gesture. Hereinafter, an example in which a touch gesture is applied to the first region 210 among the sub-regions 210 and 220 of the display unit 151 will be described. However, it should be understood that a touch gesture applied to the other sub-region (e.g., the second region 220) or the notch region 240 in the same manner as described above may also be classified as various touch inputs.

First, (a) of FIG. 7A illustrates an example of a touch input applied to one point of the first region 210. For example, when a touch gesture in which a touch object contacts one point 710 of the first region 210 is sensed, the controller 180 may recognize that the touch input is applied to the one point 710.

In this case, although contacting is not made, if the touch object is hovering at the one point 710 for a predetermined time or longer, the controller 180 may sense the touch gesture based on the proximity sensor or the optical sensor (camera) and classify the touch gesture as a touch input with respect to the one point 710. Thus, the touch input according to the touch gesture may be sensed in such an air gesture manner that an actual touch is not made.

The touch gesture of applying the touch input to one point may be used as a method for designating a specific region. That is, when different notification information is displayed in the sub-regions (the first region 210 and the second region 220) or sub-regions and the notch region 240, any one thereof may be selected according to the touch gesture and related information thereof may be displayed. Here, the controller 180 may display related information corresponding to the selected region in at least a portion of the main region 280 (See FIGS. 3B and 3C).

Meanwhile, when a specific region is designated according to the touch gesture, the controller 180 may execute a function corresponding to the specific region. That is, based on the touch gesture, the controller 180 may detect a touch input applied to one of the sub-regions or the notch region 240, and execute a specific function corresponding to a region to which the touch input is applied. Here, the functions corresponding to the sub-regions and the notch region 240 may be designated by the user, or functions related to the frequently used application or program may be automatically designated.

Alternatively, based on the touch gesture of applying the touch input to the one point, the controller 180 may determine a region for displaying specific information. For example, the controller 180 may display information, which is selected by the user from among pieces of information displayed in the main region 280, in any one of the sub-regions (the first region 210 and the second region 220). In this case, the controller 180 may determine a region in which the information selected by the user is displayed, as a region to which the touch gesture is applied.

Meanwhile, when a touch input is sensed, the controller 180 may sense a touch gesture of dragging the touch input. Similarly, the touch gesture of dragging the touch input may be sensed in an air gesture manner using the proximity sensor or the optical sensor.

Then, the controller 180 may classify the touch gesture as a different touch input according to a trace in which the touch input is dragged. For example, a touch gesture of dragging the touch input in a vertical direction as illustrated in (b) of FIG. 7A and a touch gesture of dragging the touch input in a horizontal direction as illustrated in (c) of FIG. 7A may be classified as different touch inputs.

Therefore, the touch gesture of forming the drag trace in the horizontal direction and the touch gesture of forming the drag trace in the vertical direction may be respectively applied as inputs of different applications or programs or as inputs for performing different processing with respect to a specific function or application.

For example, as illustrated in (b) of FIG. 7A, the touch gesture that forms a drag trace in the vertical direction may be a touch gesture for executing a specific function matched to the touch input-applied region, i.e., any one of the first region 210, the second region 220, and the notch region 240.

For example, different functions may correspond to the sub-regions (the first region 210 and the second region 220), or the sub-regions and the notch region 240, respectively. Of course, the functions respectively corresponding to the regions may be determined according to a current operational state of the mobile terminal 100 or a function currently executed in the mobile terminal 100.

In this case, when a touch input is applied to any one of the sub-regions 210 and 220 or the notch region 240 and a touch gesture of dragging the applied touch input in the vertical direction is sensed, the controller 180 may execute a function corresponding to the touch input-applied region. Also, the controller 180 may display an execution screen according to the executed function in at least a portion of the main region 280.

Meanwhile, the different functions respectively matched to the sub-regions 210 and 220 and the notch region 240 may be functions that perform different processes for an application or program currently executed in the mobile terminal 100. Accordingly, the controller 180 may process different functions for the application or program currently executed in the mobile terminal 100 according to the region to which the touch gesture of forming the drag trace is applied. Also, it may be controlled or processed in different manners according to a direction in which the drag trace is formed.

For example, if an application currently being executed in the mobile terminal 100 is a playback application for playing sound source data, the sub-regions may correspond to a function of controlling the volume and a function of selecting a piece of music, respectively. Then, as illustrated in (c) of FIG. 7A, the controller 180 may select any one of the functions based on the touch gesture of dragging the touch input in the horizontal direction, and process the selected function differently according to a direction in which the touch input is dragged.

For example, in case where the touch input is applied to a region corresponding to the volume control function, the controller 180 may increase or decrease the volume according to which of leftward and rightward directions the touch input is dragged. Alternatively, in case where the touch input is applied to a region corresponding to the music selection function, the controller 180 may play (or reproduce) a previous piece of music or a next piece of music according to which of the leftward and rightward directions the touch input is dragged.

Meanwhile, the controller 180 may classify the touch input based on a start point or an end point of the touch gesture of dragging the touch input. For example, as illustrated in (d) of FIG. 7A, when the main region 280 is divided into a plurality of regions and a touch input applied to the first region 210 is dragged to each of the divided regions 702, 704, and 706 of the main region, the controller 180 may recognize them as the same touch gesture or different touch inputs. Here, the divided regions 702, 704, and 706 of the main region 280 may be the region 702 corresponding to the first region 210, the region 704 corresponding to the second region 220, and the region 706 corresponding to the notch region 240.

In this case, when the region corresponding to the touch input is identified according to the start point position of the touch input as illustrated in step S604 of FIG. 6, although the regions corresponding to the end points 716a, 716b, and 716c are different regions, if the start point 710 of the touch input is the same, touch gestures of dragging the touch input applied to the first region 210 to the respective end points 716a, 716b, and 716c may be identified as the same touch input. Thus, in case where each of the touch gestures is applied, the controller 180 may perform a function corresponding to the first region 210 or perform control corresponding to the first region 210.

Meanwhile, in case where regions corresponding to the touch input are identified according to the end point positions of the touch input, the controller 180 may identify each touch gesture dragging the touch input 710 applied to the first region 210 to the first end point 716a of the region 720 corresponding to the first region 210, to the second end point 716b of the region 704 corresponding to the second region 220, and to the third end point 716c of the region 706 corresponding to the notch region as touch inputs applied to different regions as illustrated in (d) of FIG. 7A.

In this case, the touch gesture dragged to the first end point 716a may be identified as a touch input applied to the first region 210. However, the touch gesture dragged to the second end point 716b and the touch gesture dragged to the third end point 716c may be respectively identified as touch inputs applied to the second region 220 and the notch region 240. The controller 180 may execute the function corresponding to the identified region or perform control corresponding to the identified region.

Meanwhile, the controller 180 may classify the touch inputs as different inputs according to the number of sensed touch objects. For example, (a) and (b) of FIG. 7B illustrate examples of touch gestures having different numbers of touch objects.

Referring to (a) of FIG. 7B, (a) of FIG. 7B illustrates an example of a touch gesture of dragging a touch input applied to one point 710 by one touch object in one direction. In contrast, (b) of FIG. 7B illustrates an example of a touch gesture of dragging touch inputs applied to a plurality of points 710a and 710b by a plurality of touch objects in one direction.

As illustrated in (a) and (b) of FIG. 7B, although the drag inputs form traces in the same direction, the controller 180 may identify the touches as different touch inputs according to the number of touch objects applying the touch inputs. In case where the touch gestures are identified as different touch inputs, the controller 180 may perform different functions based on the respective touch gestures.

For example, in case where an SNS (Social Network Service) event occurs, the mobile terminal 100 may display notification information for notifying the generated event in at least one of the sub-regions. For example, the notification information may be displayed in any one of the first region 210 and the second region 220, or the first region 210 and the second region 220 may include different pieces of SNS event occurrence notification information.

In this case, when a plurality of touch inputs are applied to any one of the regions in which the notification information is displayed and a touch gesture of dragging the plurality of touch inputs is sensed, the controller 180 may terminate displaying of the notification information of the corresponding region. Meanwhile, when touch input is applied to any one region and a touch gesture of dragging the one touch input is sensed, information related to the notification information of the corresponding region may be displayed on the display unit 151.

Here, the information related to the notification information may be at least a portion of the generated SNS event, that is, the contents of a received message. In this case, the controller 180 may display information related to the notification information in one region of the main region 280 corresponding to the sub-region to which the touch input is applied. Or, the controller 180 may execute an SNS function corresponding to the notification information in response to the touch gesture of dragging the one touch input and display an execution screen of the SNS function in at least a portion of the main region 280 of the display unit 151.

Meanwhile, if the mobile terminal 100 is executing a sound source play function, the controller 180 may perform a different processing according to the type of the touch gesture applied to one of the sub-regions. For example, the controller 180 may perform processing related to the volume or perform processing related to music selection according to the type of the sensed touch gesture. That is, in case where one touch input (one touch object) is applied (one touch object) to any one of the first region 210 and the second region 220 and a touch gesture of dragging the applied touch input is sensed, the controller 180 may raise or lower the volume. However, in case where a plurality of touch inputs (a plurality of touch objects) are applied and a touch gesture of dragging the applied touch inputs is sensed, the controller 180 may play a previous music piece of a currently played music piece or a next music piece based on a region where the touch input is applied.

Figure 7D:
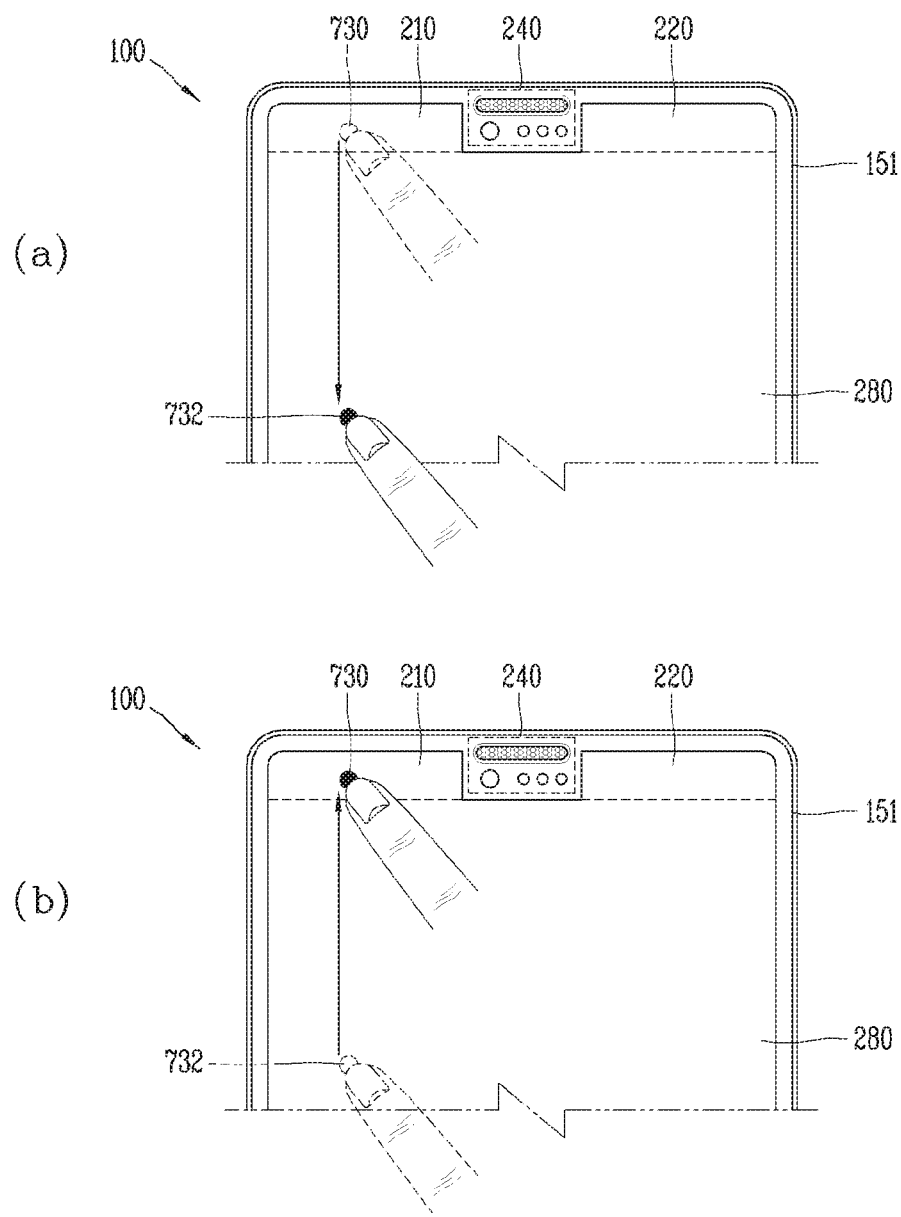

Meanwhile, in case where a touch gesture of dragging an applied touch input is sensed, the controller 180 may identify the touch gesture as different inputs according to positions of a start point or an end point of the drag trace. FIGS. 7C and 7D illustrate different examples of such a case.

First, referring to FIG. 7C, (a) of FIG. 7C illustrates an example in which a touch input is applied to any one of the sub-regions, e.g., the first region 210, and a touch gesture of dragging the touch input is applied. In the case of such a touch gesture, a start point 720 of a drag trace formed by the touch gesture may be the first region 210.

Meanwhile, (b) of FIG. 7C illustrates an example in which a touch input is applied to one point of the main region 280 and a touch gesture of dragging the touch input is applied. The main region 280 to which the touch input is applied may be a first display region 250 in which information related to the first region 210 is displayed (See FIG. 3C).

If the start points of the drag traces formed by the touch gestures are different, the controller 180 may classify the touch gestures as different inputs. For example, as illustrated in (a) of FIG. 7C, when the touch gesture in which a drag trace starts from the first region 210 is sensed, the controller 180 may determine the touch gesture as an input for displaying information related to a function corresponding to the first region or information displayed in the first region 210. Thus, the controller 180 may form the first display region 250 displaying the information related to the first region 210 in at least a portion of the main region 280 in response to the touch gesture starting from the first region. In this case, the first display region 250 may be formed in at least a portion of the main region 280 corresponding to the first region 210 in the length direction.

Meanwhile, in a state in which the first display region 250 is formed, the controller 180 may sense a touch gesture in which dragging starts from one point 720 of the first display region 250 as illustrated in (b) of FIG. 7C. In this case, the controller 180 may execute a function related to the first display region 250. For example, the controller 180 may terminate displaying of the first display region 250 based on the touch input in which dragging starts from the point 720 of the first display region 250.

Meanwhile, as illustrated in FIG. 7C, when touch gestures in which end points of drag traces are different, as well as touch gestures in which end points of drag traces are different are applied, the controller 180 identifies the touch gestures as different inputs. FIG. 7D illustrates examples of such cases.

First, referring to (a) of FIG. 7D, (a) of FIG. 7D illustrates an example in which a touch input is applied to one point 730 of the first region 210 and a touch gesture of dragging the touch input to one point 732 of the main region 280 is applied. Meanwhile, (b) of FIG. 7D illustrates an example of a touch gesture of dragging a touch input applied to one point 732 of the main region 280 to one point 730 of the first region 210.

In this case, although the lengths of drag traces formed by the respective touch gestures are equal, the controller 810 may classify the touch gestures as different inputs.

For example, as illustrated in (a) of FIG. 7D, in case where a touch gesture in which a touch input starts to be dragged from the first region 210 and terminates in the main region 280 is applied, the controller 180 may determine the touch gesture as an input for displaying information related to a function corresponding to the first region 210 or information displayed in the first region 210, in the main region 280. Accordingly, notification information displayed in the first region 210 or various types of information related to a function currently execute din the mobile terminal 100 may be displayed through the main region 280 of the display unit 151.

Meanwhile, as illustrated in (b) of FIG. 7D, in case where a touch gesture in which a drag trace starts from the main region 280 and terminates in the first region 210 is applied, the controller 180 may determine the touch gesture as an input for displaying information selected from pieces of information currently displayed in the main region, through the first region 210.

For example, if the main region 280 is displaying a plurality of images according to execution of an application such as a gallery, the controller 180 may display information regarding a plurality of images selected by the user from among the plurality of images in the first region in response to the touch gesture. Here, the plurality of selected images may be displayed as icons or thumbnails in the first region 210.

Alternatively, the controller 180 may select one of pieces of text displayed in the main region 280 in response to a touch gesture applied to the main region 280. Or, at least one of the images included in a webpage, or the like, displayed in the main region 280 may be selected in response to a touch gesture applied to the main region 280. In this state, as illustrated in (b) of FIG. 7D, when a touch gesture of dragging from one point of the region in which the selected text or image is displayed to the one point 730 of the first region 210 is sensed, the controller 180 may display information regarding the selected text or Image in the first region 210. That is, the controller 810 may provide a clip board function of displaying information corresponding to a portion of the information displayed in the main region 280 by the user, in the first region 210.

Here, the information regarding the selected image may be an icon or a thumbnail image of the selected image. Also, the information regarding the selected text may be a string corresponding to a portion of the selected text. In addition, the controller 180 of the mobile terminal 100 according to the embodiment of the present disclosure may selectively execute different functions related to a specific application or program depending on the length of the touch input or a position of the end point. FIG. 7E illustrates an example of such a case.

For example, the controller 180 may classify the main region 280 of the display unit 151 into a plurality of regions. Also, the controller 180 may execute different functions according to which of the plurality of regions end points of drag traces formed by applied touch gestures belong to.

That is, when a touch input 740 is applied to the first region 210 as illustrated in (a) of FIG. 7E, the controller 180 may classify the main region 280 of the display unit 151 into a plurality of regions 750, 752, and 754 as illustrated in (b) to (d) of FIG. 7E.

Here, the classified regions 750, 752, and 754 of the main region 280 may correspond to different functions, respectively. For example, the plurality of regions 750, 752, and 754 may correspond to different functions related to a camera application or a camera program.

For example, a first segment region 750 closest to the first region 210 may correspond to a function for general image capturing. Therefore, when an end point 742 of a drag trace is one point in the first region 210 as illustrated in (b) of FIG. 7E, the controller 180 may execute the function for general image capturing and display an image obtained from an image sensor of a camera on the display unit 151. In this case, the displayed image may be displayed as a preview image.

Also, a third segment region 754 farthest from the first region 210 may correspond to a translation function. Therefore, when the end point 742 of a drag trace is one point in the third segment region 754 as illustrated in (d) of FIG. 7E, the controller 180 may display an execution screen of the application related to the translation function and display an image including a character string obtained from an image sensor of the camera on the display unit 151.

Meanwhile, a second segment region 752 between the first segment region 750 and the third segment region 754 may correspond to an image search function. Therefore, when the end point 742 of the drag trace is one point in the second segment region 752 as illustrated in (c) of FIG. 7E, the controller 180 may display an execution screen of an application related to the image search and display an image obtained from the image sensor of the camera. Also, the controller 180 may perform searching according to the executed image search application.

Meanwhile, the functions corresponding to the respective segment regions may be arbitrarily changed by the user. Or, the functions respectively corresponding to the plurality of regions may be determined such that the plurality of functions are arranged to be closer to the sub-regions according to order of high use frequency of the user.

Meanwhile, when the main region 280 of the display unit 151 is divided into a plurality of regions according to a touch input applied to the first region 210, the controller 180 may display information of functions respectively corresponding to the plurality of divided regions in the regions such that the user may intuitively recognize the functions corresponding to the respective regions.

Meanwhile, as described above, any one of the sub-regions or the notch region 240 may correspond to a specific function. The functions corresponding to any one of the sub-regions or the notch region 240 may be determined to be different depending on an operational state of the mobile terminal 100.

For example, when the mobile terminal 100 is in a standby state (or an idle state) (a standby screen or a home screen is displayed) and when the mobile terminal 100 is in a locked state, functions corresponding to any one of the sub-regions or the notch region 240 may be different.

For example, when the mobile terminal 100 is in the standby state, the corresponding functions may be functions for a specific application executable in the mobile terminal 100. Meanwhile, when the mobile terminal 100 is in the locked state, the corresponding functions may include a function related to the locked state, for example, a function related to AOD (Always On Display) and a function related to release of the locked state (e.g., a function of directly entering an unlock screen such as a lock pattern or an iris without displaying the locked screen).

So far, various types of touch gestures applied to the sub-regions according to the notch design and various functions which may be performed according to results of recognizing the sub-regions and the touch gestures in the mobile terminal 100 having the display unit formed with the notch design according to the embodiment of the present disclosure have been described.

Hereinafter, examples of functions executed in case where any one of the touch gestures described above with reference to FIGS. 7A to 7E is applied to at least one of the first region 210 and the second region 220 and the notch region 240 will be described with reference to the accompanying drawings.

First, FIG. 8 illustrates an example of immediately executing a specific function related to a call event using the first region 210, the second region 220, and the notch region 240 when the call event occurs in the mobile terminal 100 according to an embodiment of the present disclosure.

When the call event occurs, information related to the call event that occurs may be displayed in one region of the display unit 151, e.g., the main region 280. That is, as illustrated in (a) to (c) of FIG. 8, in the case of a call incoming event, telephone number information of an incoming call may be displayed.

In this case, as illustrated in (a) of FIG. 8, a touch input may be applied to one point of the first region 210 and a touch gesture 800 of dragging the touch input may be applied. Then, the controller 180 may execute a first function corresponding to the first region 210. Here, the first function may be a function (call function) of connecting a call according to the currently generated call incoming event. Accordingly, in case where a touch input starting from the first region 210 is applied, the controller 180 may display a screen related to call permission, i.e., a screen related to a call reception permission function, in at least a portion of the main region 280.

Meanwhile, as illustrated in (b) of FIG. 8, in a state in which a call event occurs, a touch input and a second touch gesture 802 of dragging the touch input may be applied to one point of the second region 220, instead of the first region 210. Then, the controller 180 may execute a second function corresponding to the second region 220. Here, the second function may be a function different from the first function. For example, the second function may be a function (call termination function) of terminating alarm of a call incoming event which currently occurs or canceling call connection. Accordingly, when the second touch gesture 804 is applied, the controller 180 may reject call reception (call termination). Accordingly, when a touch input starting from the second region 220 is applied, the controller 180 may display a screen related to call rejection, i.e., a screen related to a call reception rejection function, in at least a portion of the main region 280. Or, the controller 180 may terminate display of notification information notifying the call reception.

As illustrated in (c) of FIG. 8, a touch input may be applied and a third touch gesture 804 of dragging the touch input may be applied to the notch region 240 in a state in which the call event occurs. In this case, the controller 180 may sense the touch input applied to the notch region from a touch sensor formed in a touch sensing region 230 formed in the periphery of the notch region 240.

Then, the controller 180 may execute a third function corresponding to the notch region 240. Here, the third function may be a function different from the first function or the second function. For example, the third function may be a quick reply function of making a quick response to a counterpart of the currently received call with an icon or a predetermined simple phrase.

Meanwhile, the third touch gesture 804 applied to the notch region 240 may be a touch gesture different from the touch gesture applied to the first region 210 or the second region 220. For example, the third touch gesture 804 may be a touch gesture of simultaneously dragging a plurality of touch inputs after the plurality of touch inputs are applied, as illustrated in (c) of FIG. 8.

That is, when the touch gesture of simultaneously dragging the plurality of touch inputs is applied to the notch region 240 as illustrated in (c) of FIG. 8, the controller 180 may identify the touch input as a touch input applied to the notch region 240. Thus, when a touch input (the first touch input 800 or the second touch input 802) is applied to the first region 210 or the second region 220 in the vicinity of the notch region 240, the controller may distinguish the applied touch input from a touch input applied to the notch region 240.

Meanwhile, the example in which different functions are performed as the touch gestures of the same type, i.e., the touch gestures of dragging any one touch input are applied to different regions in the case of (a) and (b) of FIG. 8 has been described.

However, the controller 180 of the mobile terminal 100 according to an embodiment of the present disclosure may distinguish between touch gestures applied to the same region as different touch inputs according to types of the touch gestures.

FIG. 9 is an example in which different functions are performed according to types of touch gestures applied to the divided sub-regions of the display unit 151 in the mobile terminal 100 according to the present disclosure.

Hereinafter, an example in which the mobile terminal 100 performs a playback (or reproduction) function for playing sound source data will be described with reference to FIG. 9. Here, it is assumed that an execution screen of an application related to playback of the sound source data is executed in a state that it is not displayed on the display unit 151 (background).

Meanwhile, when the application related to playback of sound source data is executed, different functions of the application may correspond to the first region 210 and the second region 220, respectively. For example, as illustrated in FIG. 9 (a), a volume-up function for raising the volume or a volume-down function for lowering the volume may correspond to each of the first region 210 or the second region 210. Or, as illustrated in (b) of FIG. 9, a previous music selection function for selecting sound source data before the currently played music source data or a next music selection function for selecting sound source data following the currently played music source data may correspond to each of the first region 210 or the second region 220.

In this case, the controller 180 may identify one of the sub-regions 210 and 220 selected according to a region to which a touch gesture is applied. Also, the controller 180 may identify the touch gesture as a touch gesture for any one of different functions respectively corresponding to the sub-regions 210 and 220 according to a type of the applied touch gesture. In this case, the controller 180 may determine a set of functions respectively corresponding to the first region 210 and the second region 220 according to the number of touch objects applying a touch input and control any one according to a region to which a touch gesture is applied.

For example, if one touch object applying a touch input is provided, the controller 180 may match the volume-up function and the volume-down function to the first region 210 and the second region 220, respectively. Meanwhile, if a plurality of touch objects applying a touch input are provided, the first region 210 and the second region 220 may be matched to a previous music selection function and a next music selection function, respectively. When a touch gesture of dragging the applied touch input is applied, a function corresponding to any one region may be controlled based on a start point or an end point of the dragged touch input.

Accordingly, when a touch gesture of dragging one touch input applied to the first region 210 is applied, the controller 180 may control a function corresponding to a case in which one touch input is applied to the first region 210. Therefore, as illustrated in (a) of FIG. 9, the volume may be raised through the volume-up function.

Meanwhile, when a touch gesture of dragging a plurality of touch inputs applied to the first region 210 is applied, the controller 180 may control a function corresponding to a case where a plurality of touch inputs are applied to the first region 210. Therefore, as illustrated in (b) of FIG. 9, sound source data which was played before the currently played sound source data may be played again through the previous music selection function.

It has been described that, in the mobile terminal 100 according to the embodiment of the present disclosure, the sub-regions such as the first region 210 and the second region 220 may be used as regions displaying various types of image information related to the currently executed function. In this case, the sub-regions may output different types of information, respectively. Also, the sub-regions may further include a portion of the main region 280 of the display unit 151 adjacent thereto as an extended region connected to the sub-regions.

FIG. 10 is a view illustrating an example of displaying information related to a function currently being executed in the mobile terminal 100, in the sub-region and a portion of the main region in the mobile terminal 100 according to the present disclosure. Hereinafter, an example of an artificial intelligence (AI) assistant function will be described as an example of a function being executed in the mobile terminal 100 with reference to FIG. 10. In this case, the controller 180 may display information output according to the AI assistant function and information input by the user, in different sub-regions and a portion of the main region.

First, referring to the first diagram of FIG. 10, the first diagram of FIG. 10 illustrates an example of a screen displayed when the AI assistant function is performed according to the above-described example.

As illustrated in the first diagram of FIG. 10, the controller 180 may display information related to a currently executed function through the first region 210. Thus, the name of the currently executed function ('Assistant') may be displayed in the first region 210.

In this case, as illustrated in the first diagram of FIG. 10, other information related to the currently executed function may be displayed through a partial region (a first display region 1000) of the main region 280. In this case, the first display region 1000 may be displayed to be connected to the first region 210. Therefore, information output from the function of the currently executed AI assistant may be displayed in the first display region 1000.

Meanwhile, in response to the displayed information, the user may input a question. For example, the question may be input via voice input or an input method editor (IME) means such as a keyboard. In this case, the information input by the user may be displayed in a sub-region different from the first region, i.e., the second region, and a partial region of the main region 280 formed to be connected to the second region 220, i.e., a second display region 1002. That is, when the sources of the pieces of output information are different, the information may be displayed in different sub-regions.

Meanwhile, when the user's question is input, the controller 180 may display an answer to the currently input question based on search results according to the currently executed AI assistant function. In this case, since a source of the currently displayed information is the function of the AI assistant, the information may be displayed in at least one of the first region 210 and the first display region 1000. The third diagram in FIG. 10 illustrates this example.

Meanwhile, the controller 180 may provide more detailed information related to the currently displayed information according to a user selection. For example, when a user's additional selection (e.g., touch input 1020) is sensed on the first display region 1000 displaying answer information as illustrated in the third diagram of FIG. 10, the controller 180 may further display more detailed search results regarding the information displayed in the first display region 1000, as additional information. The fourth diagram of FIG. 10 illustrates an example in which additional information is further displayed in the first display region 1000 according to the user's additional selection.

Meanwhile, unlike the first display region 1000 formed in a portion of the main region 280 in the fourth diagram of FIG. 10, the additional information may be displayed all over the main region 280 on the display unit 151. If the information related to the currently executed function is displayed on the entire main region 280, the first display region 1000 may not be displayed any longer.

Figure 11:
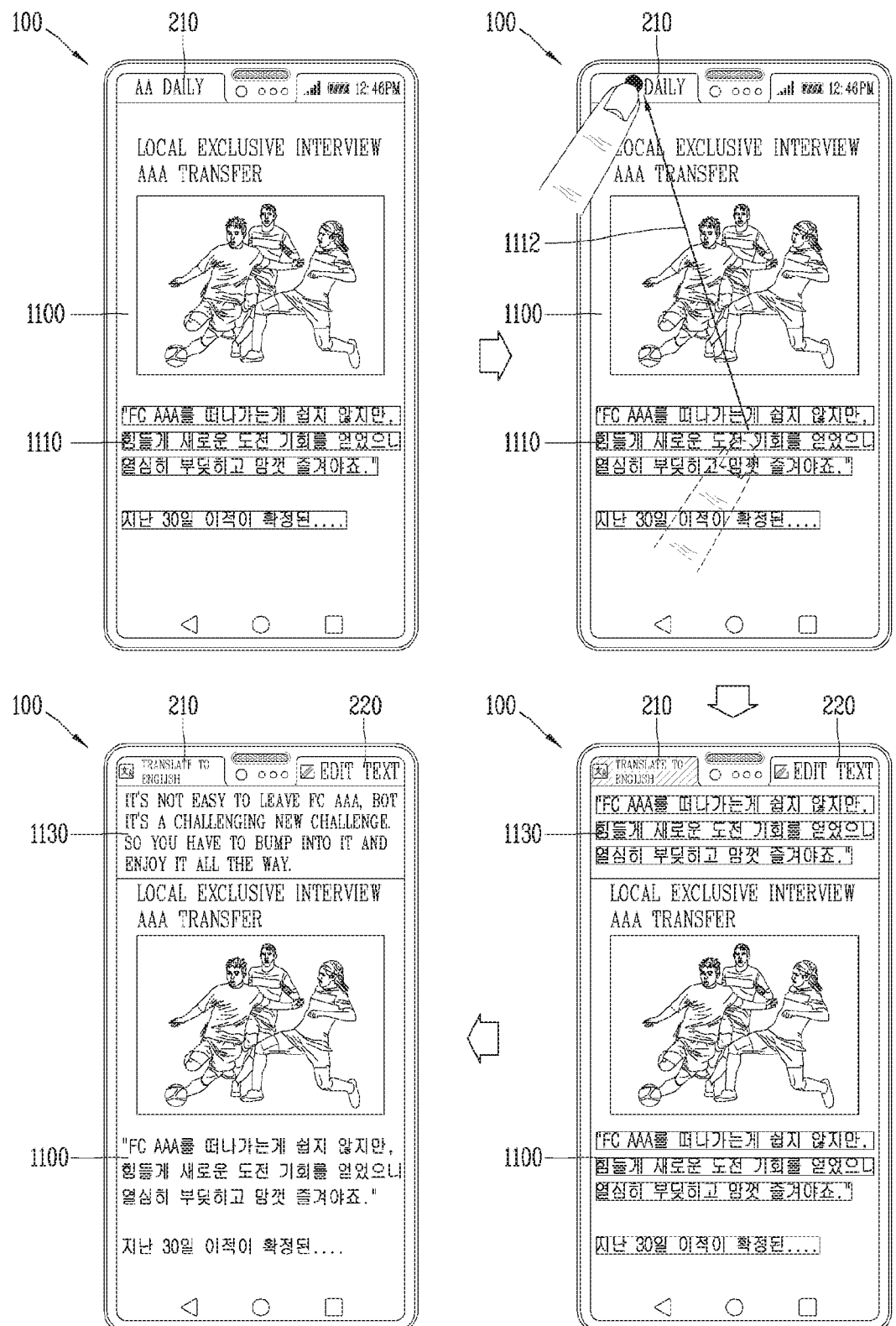
FIG. 11 is a diagram illustrating an example of performing a different related function using a sub-region in a mobile terminal according to the present disclosure.

FIG. 11 is a diagram illustrating an example in which, in the mobile terminal 100 related to the present disclosure, a function of translating a text string displayed in the main region into another language using a sub-region in relation to a currently executed function.

First, referring to the first diagram of FIG. 11, the first diagram of FIG. 11 illustrates an example in which a Web page 1100 is displayed on the display unit 151. In this case, at least one of the sub-regions (e.g., the first region 210 and the second region 220) (e.g., the first region 210) may display information regarding the currently connected Web page. Also, the other sub-region (e.g., the second region 220) may display status information such as a current status of the mobile terminal 100, i.e., information on a battery status, a network status, and the like.

Meanwhile, in this state, the controller 180 may select a portion of a character string 1110 displayed on the Web page 1100 based on a touch input applied to the display unit 151. For example, as illustrated in the first diagram of FIG. 11, the user may select a character string including at least one character along a trace in which the touch input applied to the Web page 1100 is dragged.

Meanwhile, when a touch input is applied in the region where the selected character string is displayed, the controller 180 may sense a touch gesture of dragging the applied touch input. Also, the controller 180 may perform a specific function based on a point to which the touch input is dragged, i.e., an end point of the drag. Here, if the end points of the drag are different, different functions may be executed.

For example, when the end point of the drag is the first region 210, the controller 180 may execute a first function in response to the touch gesture of dragging the applied touch input. Here, the first function may be a function of displaying the selected character string 1110. Accordingly, the controller 180 may display the currently selected character string 1110 in the region corresponding to the end point of the drag, that is, in the first region 210. Or, as illustrated in the third diagram of FIG. 11, the controller 180 may form a portion of the main region 280 connected to the first region 210, that is, a first display region 1130, and display the selected character string in the first display region 1130.

In a state in which the selected character string 1110 is displayed in the first display region 1130, the controller 180 may sense a touch input applied to any one of the first region 210 and the second region 220. Also, the controller 180 may perform different functions related to the character string displayed in the first region 1130 according to the sensed touch input. For example, the function corresponding to the first region 210 may be a translation function for the selected character string 1110. Also, the function corresponding to the second region 220 may be an editing function for editing the selected character string 1110.

Accordingly, as illustrated in the third diagram of FIG. 11, when the first region 210 is selected, the controller 180 may execute the translation function. In this case, a target of the translation may be the character string currently displayed in the first display region 1130, i.e., the character string selected by the user. Therefore, as illustrated in the fourth diagram of FIG. 11, a translated character string of the selected character string according to a predetermined language may be displayed in the first display region 1130.

Meanwhile, when the second region 220 is selected, the controller 180 may execute the editing function. In this case, the controller 180 may form a second display region for displaying an editing window including information related to editing of the selected character string. Also, the controller 180 may edit the selected character string through the editing window displayed through the second display region.

Meanwhile, in the example illustrated in FIG. 11, a Web page is displayed on the display unit 151 and a portion of the character string included in the Web page is translated according to a user selection. However, it is merely illustrative and the present disclosure is not limited thereto. That is, even in many cases in which a character string is displayed, such as display of e-book, text data, and the like, as well as in the case in which the Web page is displayed on the display unit, the translation function utilizing the first region 210 or the second region 220 may be provided in a similar manner as that illustrated in FIG. 11.

Meanwhile, as described above with reference to FIG. 11, the sub-region may be a region displaying information selected by the user among pieces of the information displayed on the display unit 151. Also, the example in which the selected information is displayed through the first region 210 of a portion of the main region 280 connected to the first region 210 has been described with reference to FIG. 11, but it should be appreciated that the selected information may also be displayed using the second region 220, as well as using the first region 210.

That is, in the mobile terminal 100 according to an embodiment of the present disclosure, regions temporarily storing the information selected by the user and displaying the stored information may be formed by the number of classified sub-regions. Hereinafter, the function of temporarily storing the information selected by the user will be referred to as a 'clipboard' function.

Meanwhile, when the clipboard function is performed, the information selected by the user may be temporarily stored, and temporarily stored information may be displayed in the first region 210 or the second region 220. Or, the temporarily stored information may be displayed through a portion of the main region 280 adjacent to the first region 210, i.e., a first display region or a second display region adjacent to the second region 220.

Figure 12:
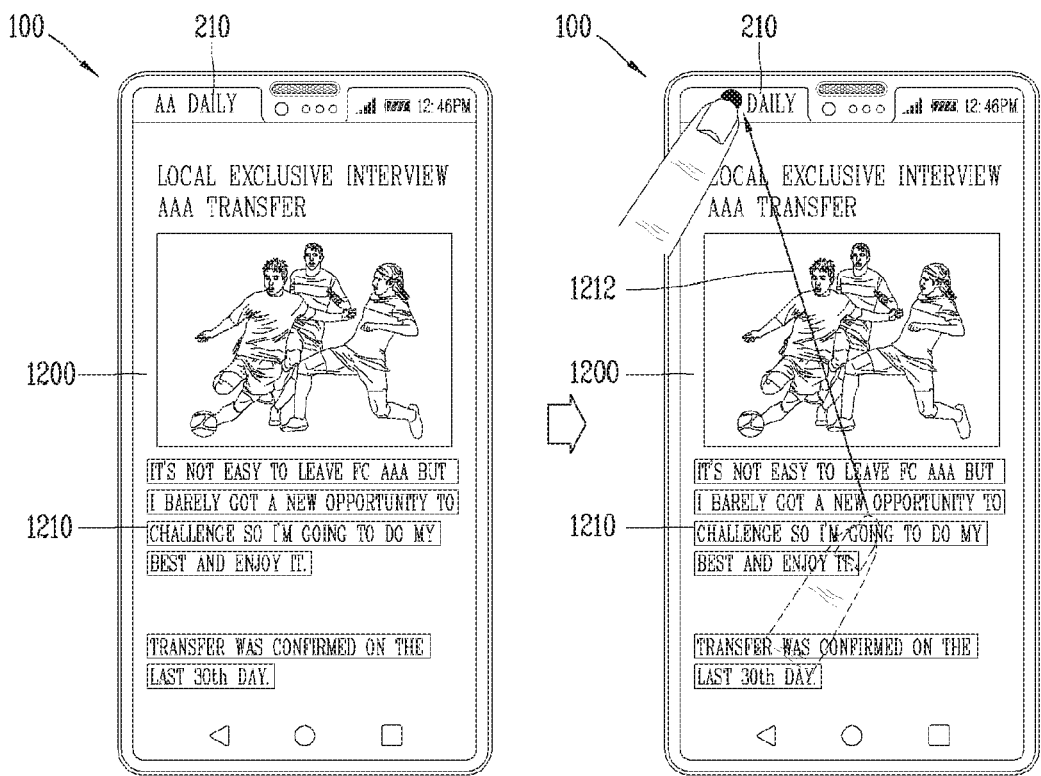
FIG. 12 is an exemplary diagram illustrating another example of performing a different related function using a sub-region in a mobile terminal according to the present disclosure.
Figure 12:
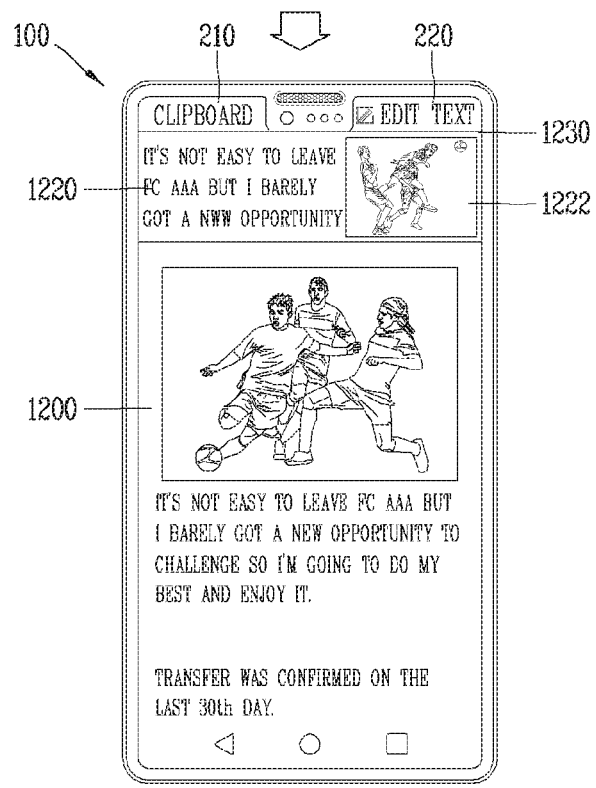

FIG. 12 is a view illustrating an example in which the clipboard function is performed using the sub-region in relation to a currently executed function in a mobile terminal according to the present disclosure.

First, the first diagram of FIG. 12 illustrates an example in which the Web page 1200 is displayed on the display unit 151. In this state, the controller 180 may select a portion of a character string 1210 displayed on the Web page 1200 based on the touch input applied to the display unit 151. For example, as illustrated in the first diagram of FIG. 12, the controller 180 may select a character string including at least one character along a trace in which the touch input applied to the Web page 1200 is dragged.

Then, the controller 180 may sense a touch input applied to the region in which the selected character string is displayed. Also, as illustrated in the second diagram of FIG. 12, a touch gesture of dragging the touch input to the first region 210 or the second region 220 may be sensed. Then, the controller 180 may execute any one function corresponding to the first region 210 or the second region 220, among the functions related to the selected character string, on the basis of the touch gesture. In this case, the function corresponding to the first region 210 will be assumed as the clipboard function.

Meanwhile, in case where the clipboard function is performed based on the touch gesture, the controller 180 may temporarily store the currently selected character string. Also, the controller 180 may display information regarding the temporarily stored string in the first region 210. Or, the controller 180 may form a first display region 1230 in a portion of the main region 280 adjacent to the first region 210 and display the temporarily stored text string 1220 in the first display region as illustrated in the third diagram of FIG. 12.

Meanwhile, as illustrated in the third drawing of FIG. 12, at least another previously stored information 1222, as well as the temporarily stored character string 1220, may be further displayed in the first region 210 or the first display region 1230. For example, when an image, or the like, is temporarily stored, the controller 180 may generate a thumbnail image from the temporarily stored image and display the generated thumbnail image in the first region 210 or the first display region 1230.

The temporarily stored information may be displayed or input again on the display unit 151 according to a user selection. For example, when the user selects paste or input for one region of the display unit 151 and selects any one of the pieces of temporarily stored information displayed in the first region 210 or the first display region 1230, the selected information may be input and displayed in the region designated by the user.

Unlike the clipboard function, information of an application or a Web document corresponding to a screen currently displayed on the display unit 151 may be temporarily stored according to a user selection. A function of temporarily storing information of a function corresponding to the selected screen will be referred to as a 'tray function'.

Meanwhile, in a state in which the application, the Web document, or the like, is displayed, the controller 180 may sense a touch gesture applied to the display unit 151. For example, the controller 180 may determine whether a sensed touch gesture is a touch gesture in which a touch input is applied in a region in which a selected object is displayed and the touch input is dragged in a state in which one region or the object is selected, or whether the sensed touch gesture is a touch gesture in which a touch input is applied to one point on the display unit 151 and the touch input is dragged in a state in which the one region or the object is not selected. In the former case, the controller 180 may determine the touch gesture as a touch gesture for executing the clipboard function, and in the latter case, the controller 180 may determine the touch gesture as a touch gesture for executing the tray function.

Meanwhile, if the determined touch gesture is a touch gesture for the tray function, the controller 180 may temporarily store information corresponding to the screen displayed on the display unit 151 and display the temporarily stored information in a region to which the dragged touch gesture ends. Here, the region in which the dragged touch gesture ends may be the first region 210 or the second region 220.

The temporarily stored information may be information of an application currently displaying an execution screen on the display unit 151 or address information of a currently displayed Web page. The information displayed in the first region 210 or the second region 220 may be an execution image currently displayed on the display unit 151 or a thumbnail image corresponding to the currently displayed Web page. Accordingly, the user may intuitively identify the application corresponding to the currently temporarily stored information according to the tray function.

Meanwhile, in the case of the tray function, when the user selects any one of the pieces of information displayed in the first region 210 or the second region 220, the screen corresponding to the selected information may be immediately displayed on the display part 151. For example, the controller 180 may immediately execute an application corresponding to the selected information and display an execution screen. Or, the controller 180 may immediately display a document of a page corresponding to the selected information or immediately access the Web page corresponding to the selected information to display the accessed Web page.

Here, selection of any one of the information displayed in the first region 210 or the second region 220 may be performed by applying a predetermined touch gesture (e.g., double touches) to any one of the thumbnail images displayed in the first region 210 or the second region 220 or by dragging any one thumbnail image to the main region of the display unit 151.

Meanwhile, similar to the clipboard function or the tray function, it should be appreciated that objects selected by the user may be temporarily stored and information of the stored objects may be displayed through the sub-region. For example, in case where a plurality of images such as an album or a gallery are displayed and the user selects some of the images, pieces of information regarding the plurality of selected images may be displayed in the first region 210 or the second region 220. Here, the pieces of displayed information may be thumbnail images of the plurality of selected images, respectively.

Figure 13:
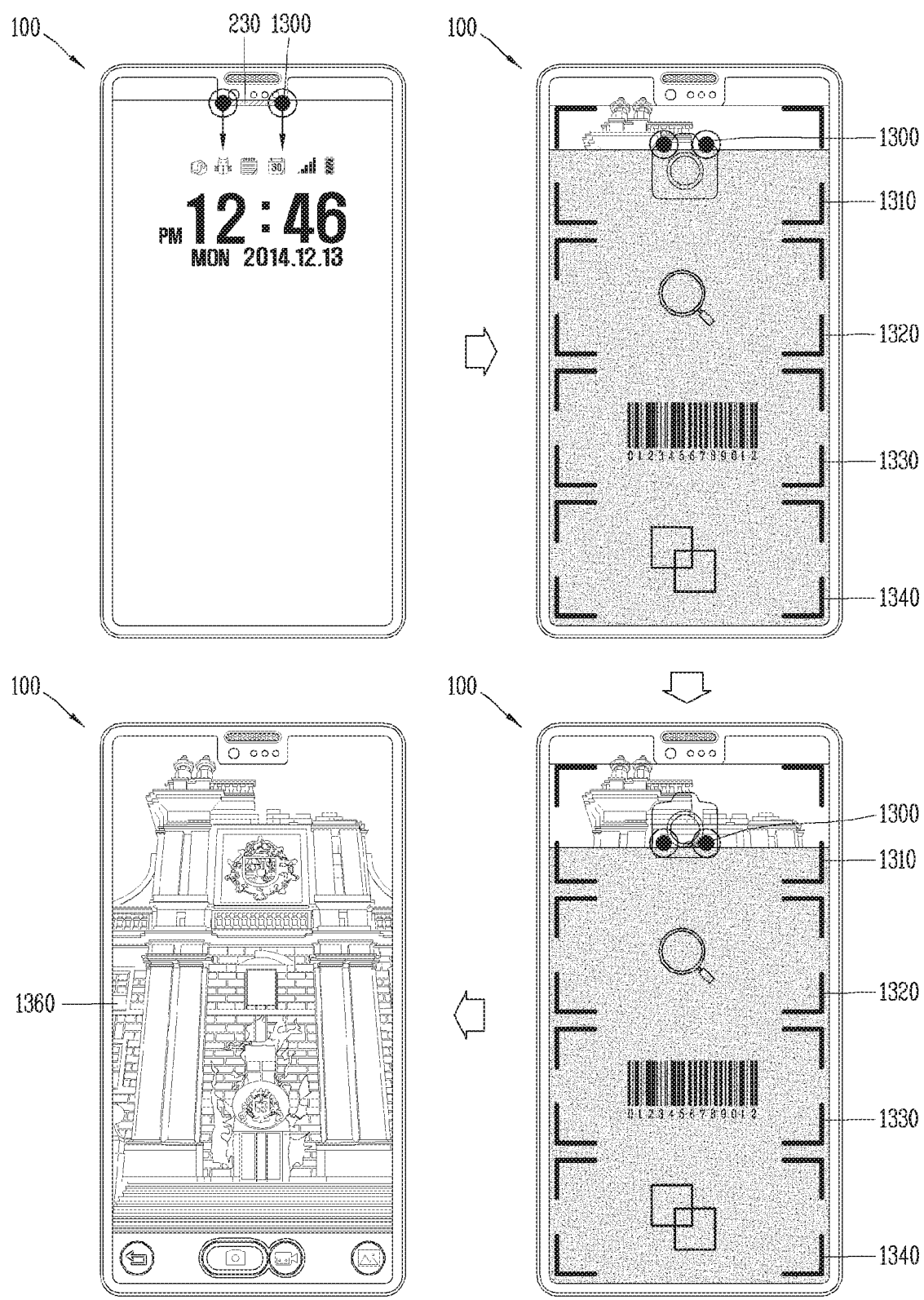
FIG. 13 is a diagram illustrating an example of performing different functions on the basis of a touch input start point and an end point according to a touch gesture sensed in a notch region in a mobile terminal according to the present disclosure.

FIG. 13 is a diagram illustrating an example in which different functions are executed on the basis of a start point and an end point of a touch input according to a sensed touch gesture in the mobile terminal 100 related to the present disclosure.

Hereinafter, a case where a touch gesture is applied to the notch region 240 in an always on display (AOD) operational state in which pieces of predetermined information are displayed in a locked screen state of the mobile terminal will be assumed and described with reference to FIG. 13.

The controller 180 of the mobile terminal 100 according to an embodiment of the present disclosure may sense a touch gesture applied to the notch region 240 in the AOD operational state. Here, the touch gesture may be one of the types of the touch gestures mentioned in FIGS. 7A to 7E. The first diagram of FIG. 13 illustrates an example in which touch inputs 1300 are applied to the notch region 240 by a plurality of touch objects in the AOD operational state of the mobile terminal 100 and a touch gesture of dragging the touch inputs 1300 are dragged.

Meanwhile, when the predetermined touch gesture is applied to the notch region 240 as illustrated in the first diagram of FIG. 13, the controller 180 may execute a specific function on the basis of the current operational state of the mobile terminal 100, a type of the touch gesture, and a region to which the touch gesture is applied.

The specific function may be a preview image display function of displaying image information sensed by the image sensor on the display unit 151 in the form of a preview image. In this case, the controller 180 may set a region in which the preview image is displayed by a region corresponding to one point on the display unit 151 to which the plurality of touch inputs 1300 are dragged. That is, the controller 180 may provide a glance view function of adjusting a size of the region in which the preview image may be displayed according to dragged length of the plurality of touch inputs 1300 in the AOD operational state.

If the preview image display function is executed, the controller 180 may cause any one of different functions related to the preview image display function to be immediately executed according to the dragged length of the plurality of touch inputs 1300. In this case, the controller 180 may form an interface allowing the user to select any one of the related functions as the plurality of touch objects applied to the notch region 240 in the current operational state of the mobile terminal 100, i.e., in the AOD operational state.

For example, as illustrated in the second diagram of FIG. 13, the controller 180 may classify the display unit 151 into a plurality of regions 1310, 1320, 1330, and 1340. Also, the controller 180 may cause functions related to the preview image display function to correspond to the plurality of regions 1310, 1320, 1330, and 1340, respectively.

For example, the functions related to the preview image may include an image capture function, an image search function, a bar code recognition function, a translation function, and the like. In this case, the image capture function may be a function of processing a preview image sensed according to the camera function and storing the processed preview image as image data of a predetermined format. The image search function may be a function of storing an image of a specific object through the preview image and providing a Web search result for the stored object. The barcode recognition function may recognize a barcode if the preview image includes the barcode, and perform a corresponding function (Web access, etc.). Also, the translation function may be a function of translating a character string of a specific language into a different language and displaying the same, if the preview image includes the character string of the specific language.

In case where the display unit 151 is classified into the plurality of regions and different related functions respectively correspond to the plurality of regions 1310, 1320, 1330, and 1340, the controller 180 may display pieces of identification information of the functions respectively corresponding to the plurality of regions 1310, 1320, 1330, and 1340, as illustrated in the second diagram of FIG. 13.

When the plurality of classified regions and the pieces of identification information respectively corresponding to the regions are displayed, the controller 180 may determine that any one of the related functions is selected according to a point to which dragging of the plurality of touch inputs 1300 ends. Thus, as illustrated in the third diagram of FIG. 13, when the plurality of touch inputs 1300 are dragged to one point in the region 1310 corresponding to the image capture function, the controller 180 may immediately execute an application corresponding to the image capture function.

Therefore, as illustrated in the fourth diagram of FIG. 13, an execution screen 1360 of the application corresponding to the image capture function may be displayed immediately in the AOD operational state.

In addition to the camera function, various other functions may be executed according to types of touch gestures applied to the sub-regions (the first region 210 and the second region 220) or the notch region 240 in the AOD operational state.

In an example of these functions, various settings related to the AOD may be changed according to types of touch gestures. That is, it is possible to change the current AOD theme to a different theme or change illumination, information displayed in the AOD state, or the like, according to positions to which a drag is input, the number of the touch objects applying the drag, a length of the drag, and the like.

Or, in case where the touch gesture is applied, background animation of the AOD may be changed based on various types of information (e.g., weather) sensed in the mobile terminal 100.

Alternatively, in the AOD operational state, the controller 180 may display a list of recently executed applications, a currently generated event, or at least a portion of an execution screen of a function being currently executed in the mobile terminal according to whether the touch gesture is applied to any one of the sub-regions or the notch region. Or, the controller 180 may immediately execute a specific function in the AOD state. For example, when the touch gesture is applied to any one of the sub-regions or the notch region in the AOD state, the controller 180 may directly enter a screen in which a lock pattern may be applied without displaying a lock screen.

Meanwhile, in the mobile terminal 100 according to an embodiment of the present disclosure, the sub-regions or the notch region may be used as a separate operational region in a state where a specific function is executed. For example, depending on whether the touch gesture is applied to at least one of the sub-regions or the notch region, the controller 180 may switch between an immersive screen display mode in which an execution screen of the currently executed function is displayed even in the sub-regions and a general screen display mode in which pieces of status information are displayed at an upper end of the display unit. Alternatively, the controller 180 may switch between a display mode in which pieces of the status information are displayed in two lines or a display mode in which the pieces of status information are not displayed.

Or, the sub-regions and the notch region may be used for the purpose of selecting a different process related to the currently executed function. For example, when a function of displaying a call record is executed, the sub-regions and the notch region may correspond to different processing methods for telephone numbers included in the call record, respectively. For example, when a touch gesture is applied to any one of the sub-regions in a state where any one of the phone numbers is selected, the controller 180 may store the selected phone number in the phone book or delete the call record corresponding to the selected telephone number according to the region where the touch gesture is applied. Meanwhile, when the touch gesture is applied in the notch region, a call according to the selected telephone number may be originated.

Meanwhile, the sub-regions may correspond to different functions, respectively. For example, the sub-regions may display different feedback information for currently performed functions. Or, the sub-regions may correspond to different control menus. In this case, when a touch gesture is applied to any one of the sub-regions, the controller 180 may display a control menu for the currently executed application or function on the display unit 151. Meanwhile, when a touch gesture is applied to the other sub-region, the controller 180 may display a control menu for the mobile terminal 100 system on the display unit 151.

Or, in case where any one of the sub-regions is used as a region for displaying notification information indicating the occurrence of an event, or the like, an execution screen of an application or a function corresponding to the notification information may be displayed in at least portion of the display unit 151 according to selection of the sub-region. That is, the controller 180 may display a screen including information corresponding to the notification information according to selection of the sub-region in a state in which a screen according to a current operational state is displayed.

Also, in case where the sub-region is selected again or another sub-region (corresponding to termination of display of the notification information) is selected, the display of the screen including the information corresponding to the notification information may be terminated.

Meanwhile, the sub-regions may be used for displaying information related to a function currently being executed. For example, the controller 180 may display information on other functions related to the function currently being performed in the mobile terminal 100 through the sub-region. Here, the controller 180 may determine functions for displaying information in the sub-region according to history analysis results by times or areas of applications used by the user. That is, information on other functions recommended according to the currently executed function may be displayed through the sub-region based on an area where the user is currently present, a current time, and the like.

Alternatively, in the mobile terminal 100 according to an embodiment of the present disclosure, an execution screen of the currently executed function may be more widely by utilizing the sub-regions and the notch region. For example, when the sub-regions or the notch region is matched to each of operation keys related to the currently executed function (e.g., camera function), or when icons respectively corresponding to the operation keys are displayed in the sub-regions, a display region of the execution screen may be extended up to the region where the operation keys have been displayed. Therefore, an execution screen (e.g., a preview image display screen) may be displayed through a wider display region.

Meanwhile, it should be appreciated that the controller 180 may change a size of the execution screen or a template of the execution screen according to a user selection. For example, in a state in which a preview image is displayed, the controller 180 may sense a touch input corresponding to a boundary portion in which the preview image is displayed. If a touch gesture of dragging the sensed touch input is sensed, the controller 180 may change an aspect ratio of the preview image according to the touch gesture. In this case, a preview image displayed as a screen in an aspect ratio of 16:9 may be changed to a screen in an aspect ratio of 4:3 and displayed according to the touch gesture, or vice versa.

In the above description, a touch gesture of dragging a touch input has been mentioned. However, it should be appreciated that the touch gesture may be performed in an air gesture manner in which a touch object does not contact the mobile terminal 100. That is, the controller 180 may sense a touch object hovering for a predetermined time or longer in a state of being separated from the display unit 151 and determine the same as a touch gesture corresponding to the touch input. When the hovered touch object moves, the controller 180 may determined that the touch input is dragged according to the movement of the touch object. Meanwhile, the hovering of the touch object or the movement of the hovered touch object may be sensed by an optical sensor such as a camera or at least one proximity sensor.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

What is claimed is:

1. A mobile terminal comprising:
a main body having a front side and a rear side;
at least one sensor located at the front side of the main body;
a display located at the front side of the main body and including:
a main display region; and
first and second sub-display regions extending from the main display region such that the at least one sensor is interposed between the first sub-display region and the second sub-display region;
a notch region formed at the front side of the main body and recessed toward the main display region between the first sub-display region and the second sub-display region; and
a controller configured to:
sense a first drag touch input starting in any one of the first and second sub-display regions and the notch region and ending in the main display region;
identify the first drag touch input as an input for a function corresponding to the one of the first and second sub-display regions and the notch region based on a region where the first drag touch input is started;
generate a display region in the main display region that extends along a length direction of the display from the region where the first drag touch input is started;
cause the display to display an execution screen of the function controlled according to the input of the first drag touch input in the generated display region; and
identify a second drag touch input received in the generated display region as a touch input for the region where the first drag touch input is started.

2. The mobile terminal of claim 1, wherein:
the at least one sensor is located at the notch region; and
the at least one sensor includes at least one of a camera, an illumination sensor, or a proximity sensor.

3. The mobile terminal of claim 1, wherein when an event related to a second application occurs while an execution screen of a first application is displayed on the main display region, the controller is further configured to cause the display to:
continue displaying the execution screen of the first application on the main display region; and
display information related to the event on at least one of the first or second sub-display region.

4. The mobile terminal of claim 3, wherein the controller is further configured to:
cause the display to display a first control screen related to the event on the first sub-display region;
cause the display to display a second control screen related to the event on the second sub-display region; and
perform a different function related to the event based on whether the first drag touch input starts from the first or second sub-display region.

5. The mobile terminal of claim 4, wherein:
the second application is a call function-related application;
the event related to the second application is call reception; and
the controller is further configured to cause the display to:
display a call accepting function screen as the first control screen on the first sub-display region; and
display a call rejecting function screen as the second control screen on the second sub-display region.

6. The mobile terminal of claim 3, wherein the controller is further configured to cause the display to:
display the information related to the event on the first sub-display region; and
display an execution screen of the second application including the information related to the event on the main display region in response to a drag touch input starting from the first sub-display region.

7. The mobile terminal of claim 6, wherein a size of the execution screen of the first application displayed on the main display region is gradually reduced when the execution screen of the second application is displayed on the main display region.

8. The mobile terminal of claim 6, wherein:
a first function related to the second application corresponds to the first sub-display region and a second function related to the second application corresponds to the second sub-display region when the execution screen of the second application is displayed on the main display region; and
the controller is further configured to cause the display to display an execution screen of the first or second function as the execution screen of the second application based on a starting point of the touch drag input that starts from the first or second sub-display region.

9. The mobile terminal of claim 6, wherein:
the execution screen of the second application is displayed at a portion of the main display region corresponding to the first sub-display region; and
the controller is further configured to cause the display to display a first execution screen of the second application corresponding to the first sub-display region and a second execution screen of the second application corresponding to the second sub-display region together on the main display region in response to a touch drag input starting from the second sub-display region.

10. The mobile terminal of claim 1, wherein when the first drag touch input starts from the one of the first sub-display region, the second sub-display region, and the notch region, the controller is further configured to cause the display to display the execution screen according to the function corresponding to the region from which the first drag touch input starts based on a number of touch objects used to apply the first drag touch input.

11. The mobile terminal of claim 1, wherein:
a third drag touch input starts from one point of the main display region including a plurality of objects, at least one of the plurality of objects selected by the third drag touch input; and
the controller is further configured to cause the display to display information corresponding to the at least one selected object in the first or second sub-display region based whether the third drag touch input ends at the first or second sub-display region.

12. The mobile terminal of claim 11, wherein:
the information corresponding to the at least one selected object includes a thumbnail image corresponding to the selected object or a portion of the selected object; and
the controller is further configured to cause the display to display the information corresponding to the at least one selected object in at least a portion of the main display region adjacent to the first or second sub-display region based on whether a touch input is received at the first or second sub-display region.

13. The mobile terminal of claim 1, wherein:
the first drag touch input starts from a region in which a character string selected by a user is displayed, the selected character string being one of a plurality of character strings displayed in the main display region, and the first drag touch input ends at the first or second sub-display region; and
the controller is further configured to:
cause the display to display the selected character string in at least a portion of the main display region adjacent to the first or second sub-display region at which the first drag touch input ends; and
control a different function related to the character string based on whether the second drag touch input is received at the first or second sub-display region, the second drag touch input received while the character string is displayed in the portion of the main display region.

14. The mobile terminal of claim 13, wherein:
the different function related to the character string is a function of translating the character string or a function of editing the character string; and
the controller is further configured to cause the display to display an execution screen corresponding to the function of translating or an execution screen corresponding to the function of editing in at least a portion of the main display region based on whether the second touch is received at the first or second sub-display region.

15. A method for controlling a mobile terminal comprising a main body and a display comprising a main display region and first and second sub-display regions extending from the main display region such that at least one sensor is interposed between the first sub-display region and the second sub-display region, the mobile terminal further comprising a notch region formed at a front side of the main body and recessed toward the main display region between the first sub-display region and the second sub-display region, the method comprising:
sensing a first drag touch input starting in any one of the first and second sub-display regions and the notch region and ending in the main display region;
identifying the first drag touch input as an input for a function corresponding to the one of the first and second sub-display regions and the notch region based on a region where the first drag touch input is started;
generating a display region in the main display region that extends along a length direction of the display from the region where the first drag touch input is started;
displaying an execution screen of the function controlled according to the input of the first drag touch input in the generated display region; and
identifying a second drag touch input received in the generated display region as a touch input for the region where the first drag touch input is started.

* * * * *